(12) United States Patent
Kieffer et al.

(10) Patent No.: US 11,052,619 B1
(45) Date of Patent: Jul. 6, 2021

(54) FABRICATION APPARATUSES AND METHODS

(71) Applicant: Plastics Unlimited, Inc., Preston, IA (US)

(72) Inventors: Travis Kieffer, Spragueville, IA (US); Ben Clarke, Clinton, IA (US); Mike Rederer, Maquoketa, IA (US); Jason Gregorich, Preston, IA (US); Terry Kieffer, Preston, IA (US)

(73) Assignee: Plastics Unlimited, Inc., Preston, IA (US)

( * ) Notice: Subject to any disclaimer, the term of this patent is extended or adjusted under 35 U.S.C. 154(b) by 518 days.

(21) Appl. No.: 15/711,914

(22) Filed: Sep. 21, 2017

Related U.S. Application Data

(63) Continuation-in-part of application No. 14/265,047, filed on Apr. 29, 2014, now Pat. No. 10,807,320.

(60) Provisional application No. 62/397,627, filed on Sep. 21, 2016, provisional application No. 61/816,905, filed on Apr. 29, 2013.

(51) Int. Cl.
| | |
|---|---|
| *B29C 70/44* | (2006.01) |
| *B29C 70/54* | (2006.01) |
| *B29C 70/34* | (2006.01) |
| *B29C 43/36* | (2006.01) |
| *B29C 43/12* | (2006.01) |

(52) U.S. Cl.
CPC .............. *B29C 70/44* (2013.01); *B29C 43/12* (2013.01); *B29C 43/3642* (2013.01); *B29C 70/342* (2013.01); *B29C 70/543* (2013.01); *B29C 2043/3644* (2013.01)

(58) Field of Classification Search
CPC ..... B29C 70/44; B29C 70/342; B29C 70/543; B29C 43/12; B29C 43/3642
See application file for complete search history.

(56) References Cited

U.S. PATENT DOCUMENTS

| | | |
|---|---|---|
| 2,857,626 A | 10/1958 | Wagner et al. |
| 3,084,391 A | 4/1963 | John |
| 4,178,406 A | 12/1979 | Russell |
| 4,201,823 A | 5/1980 | Russell |
| 4,692,111 A | 9/1987 | Wagner |
| 5,023,042 A | 6/1991 | Efferding |
| 5,052,906 A | 10/1991 | Seemann |
| 5,059,377 A * | 10/1991 | Ashton ................... B29C 33/40 264/225 |
| 5,129,813 A | 7/1992 | Shepherd |
| 5,281,388 A | 1/1994 | Palmer et al. |
| 5,439,631 A | 8/1995 | Schneider et al. |
| 5,702,663 A | 12/1997 | Seemann |
| 5,932,256 A | 8/1999 | Mandish |

(Continued)

*Primary Examiner* — Matthew J Daniels
(74) *Attorney, Agent, or Firm* — Hamilton IP Law, PC; Jay R. Hamilton; Charles Damschen

(57) ABSTRACT

One embodiment of a method according to the present disclosure may use a fixture with one or more boot recesses formed therein. An embedded member may be engaged with a boot and placed in a boot recess. Substrate lay-up may be placed around all or a portion of the embedded member and an outer member may be positioned over the substrate lay-up. A cover may be positioned over the outer member and engaged with the fixture. The pressure within an interior portion of the fixture may be reduced to less than ambient pressure and resin may be introduced to interact with the substrate lay-up and allowed to cure.

11 Claims, 23 Drawing Sheets

(56) References Cited

U.S. PATENT DOCUMENTS

| | | |
|---|---|---|
| 6,551,091 B1 | 4/2003 | Bryant et al. |
| 6,555,045 B2 | 4/2003 | Mcclure et al. |
| 6,609,633 B1 | 8/2003 | Dyble et al. |
| 6,676,882 B2 | 1/2004 | Benson et al. |
| 7,160,498 B2 | 1/2007 | Mataya |
| 7,931,852 B2 | 4/2011 | Kieffer |
| 2002/0149134 A1 | 10/2002 | Hemphill et al. |
| 2002/0185785 A1 | 12/2002 | Thrash et al. |
| 2008/0308960 A1 | 12/2008 | Rydin et al. |
| 2010/0112117 A1 | 5/2010 | Ross et al. |
| 2010/0239865 A1 | 9/2010 | Kallinen |
| 2011/0174426 A1 | 7/2011 | Weimer et al. |
| 2012/0175824 A1* | 7/2012 | Fergusson ............ B29C 43/3642  264/571 |
| 2012/0298296 A1 | 11/2012 | Thompson et al. |
| 2013/0241100 A1* | 9/2013 | Lownsdale ............. B29C 70/12  264/101 |

\* cited by examiner

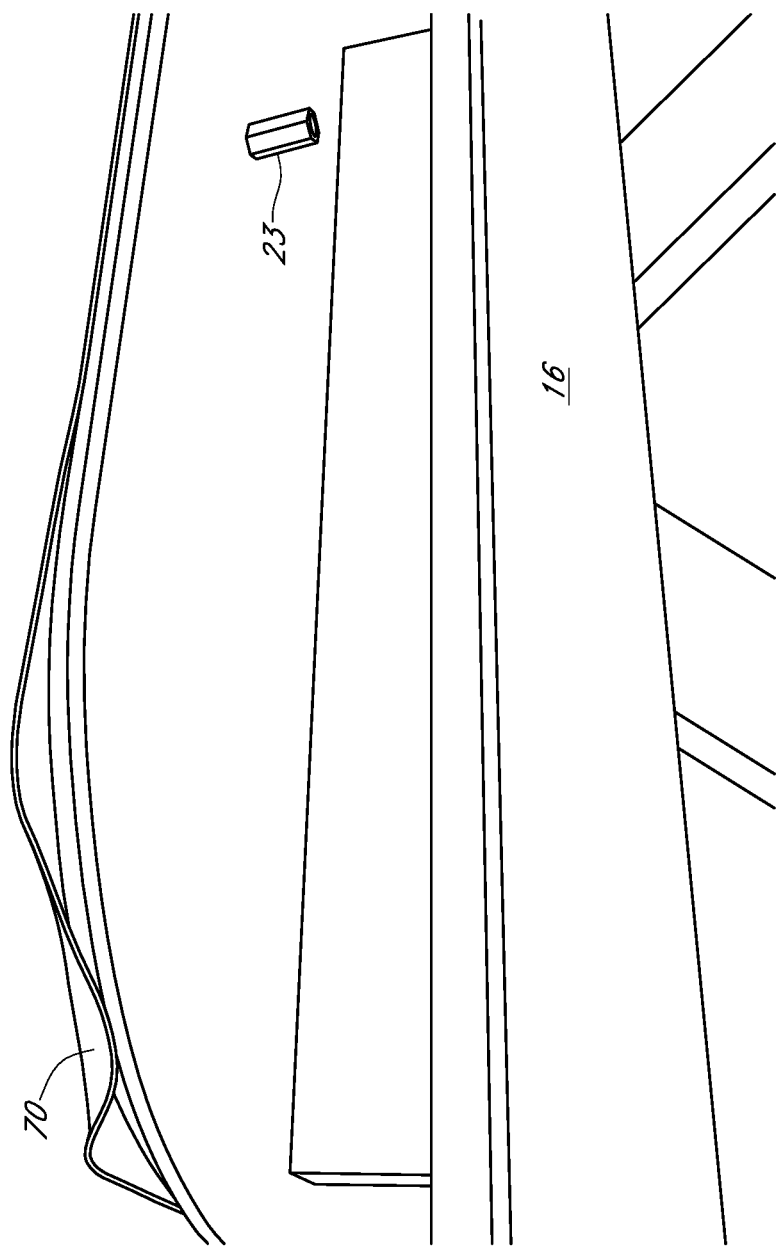

FABRICATION APPARATUSES AND METHODS

CROSS REFERENCE TO RELATED APPLICATIONS

The present patent application is a continuation-in-part of and claims priority from U.S. patent application Ser. No. 14/265,047 filed on Apr. 29, 2014, which application claimed priority from provisional U.S. Pat. App. No. 61/816,905 filed on Apr. 29, 2013. The present application also claims priority from provisional U.S. Pat. App. No. 62/397,627 filed on Sep. 21, 2016, all of which applications are incorporated by reference herein in their entireties.

FIELD OF INVENTION

This present disclosure relates to fiberglass-reinforced parts and methods and apparatuses for making same, and more specifically, to fiberglass-reinforced parts have other elements embedded therein and methods and apparatuses for making same.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. § 1.171 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF THE FIGURES

The accompanying drawings, which are incorporated in and constitute a part of this specification, illustrate embodiments and together with the description, serve to explain the principles of the methods and systems.

FIG. 18 is a bottom perspective view of a portion of the bag from FIGS. 16-17B positioned on a support base.

Figure 1:
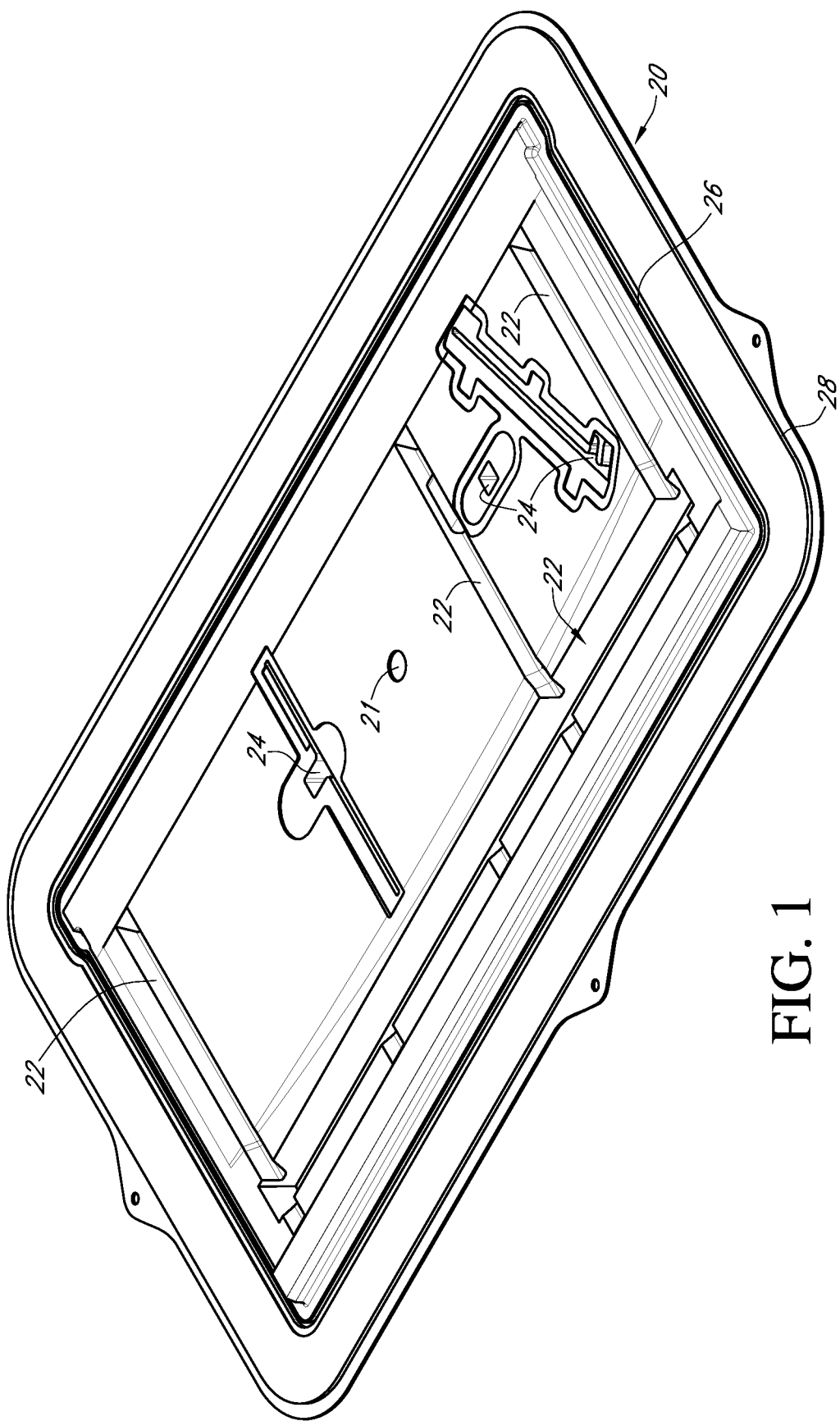
FIG. 1 is a perspective view of the top surface of one embodiment of a fixture that may be used in accordance with the present disclosure.

| DETAILED DESCRIPTION - TABLE OF THE ELEMENTS | |
|---|---|
| ELEMENT DESCRIPTION | ELEMENT # |
| Part | 10 |
| Substrate lay-up | 12 |
| Resin | 14 |
| Support base | 16 |
| Fixture | 20 |
| Outlet | 21 |
| Trough | 22 |
| Inlet | 23 |
| Boot recess | 24 |

DETAILED DESCRIPTION - TABLE OF THE ELEMENTS

| ELEMENT DESCRIPTION | ELEMENT # |
|---|---|
| Hose | 25 |
| Inner seal | 26 |
| Outer seal | 28 |
| Embedded member | 30 |
| Frame | 32 |
| Ear | 34 |
| Extending portion | 36 |
| Boot | 38 |
| Cover | 40 |
| Interior surface | 42 |
| Sealing portion | 42a |
| Outer member | 50 |
| Flange | 52 |
| Inlet location | 52a |
| Caul plate | 60 |
| Resin side | 60a |
| Bag side | 60b |
| Border | 61 |
| Caul plate inlet | 61a |
| Aperture | 62 |
| Contour | 63 |
| Vacuum port | 64 |
| Bag | 70 |
| Peripheral material | 70a |
| Bag border | 71 |
| Bag inlet | 71a |
| Seat | 72 |
| Bag contour | 73 |
| Bag vacuum port | 74 |
| Reinforcement material | 76 |
| Vacuum trough | 78 |
| Peripheral seal | 79 |
| Table | 80 |
| Table cavity | 82 |
| Table contour | 83 |
| Sealing shelf | 89 |

DETAILED DESCRIPTION OF AN ILLUSTRATIVE EMBODIMENT

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

Figure 7A:
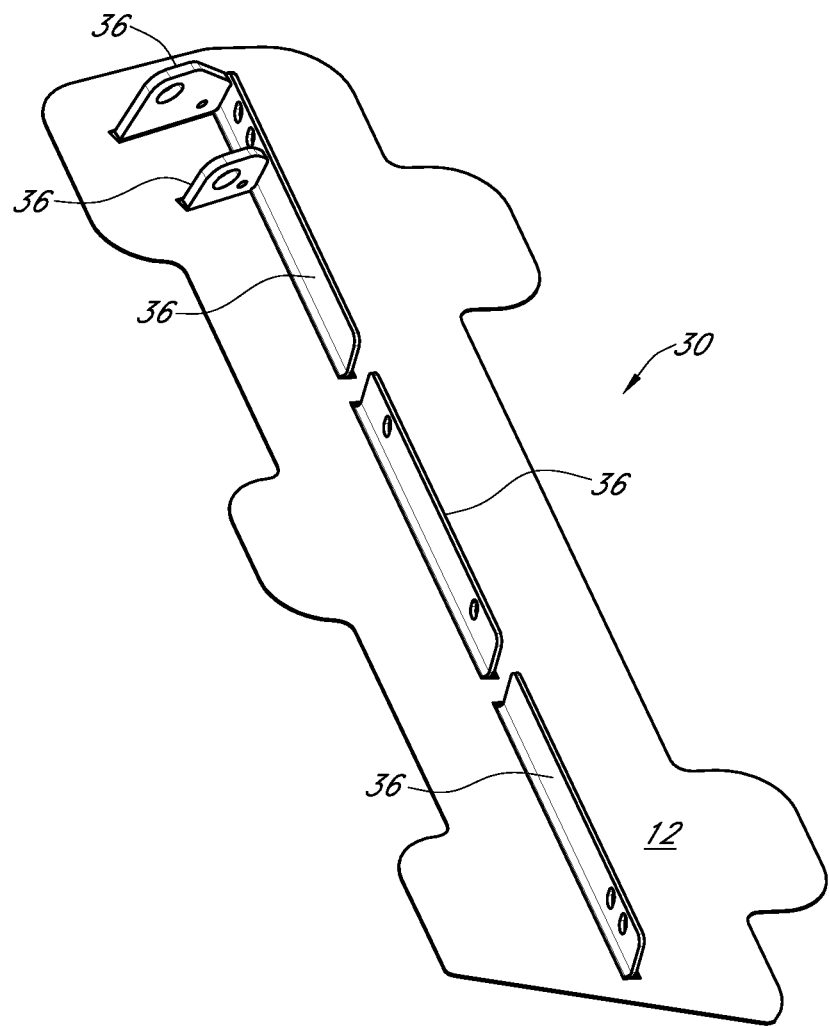
FIG. 7A is a perspective view of the top side of one embodiment of an embedded member with a portion of substrate lay-up positioned thereon, which embedded member may be positioned in a fixture.
Figure 7B:
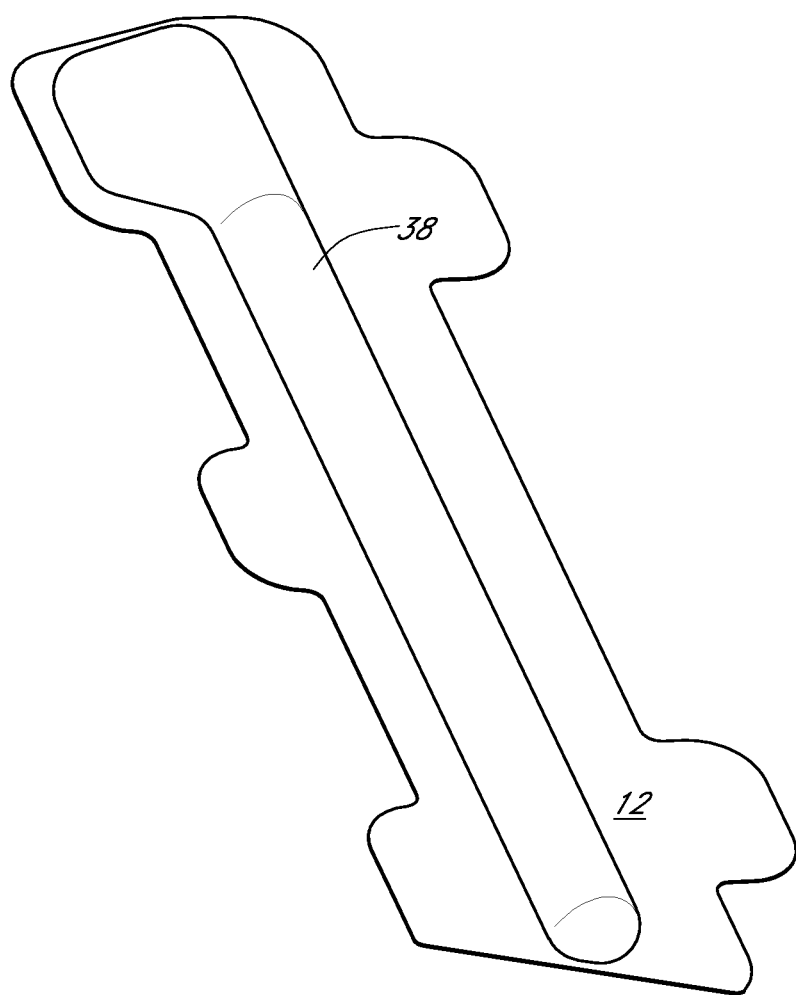
FIG. 7B is a perspective view of the top side of the embodiment of an embedded member with a boot positioned over a portion thereof.
Figure 12B:
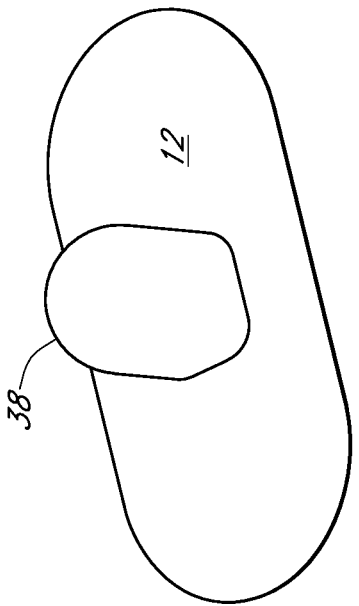
FIG. 12B is a perspective view of the top side of the embodiment of an embedded member with a boot positioned over a portion thereof.
Figure 12A:
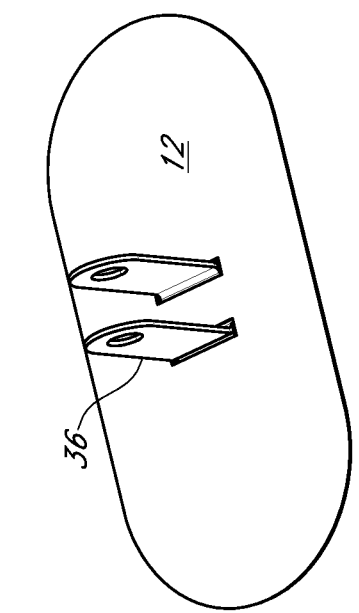
FIG. 12A is a perspective view of the top side of another embodiment of an embedded member with a portion of substrate lay-up positioned thereon, which embedded member may be positioned in a fixture.

Referring now to the figures, wherein like reference numerals designate identical or corresponding parts throughout the several views, FIG. 1 provides a perspective view of a first illustrative embodiment of a fixture 20 that may be used in accordance with the present disclosure. The present disclosure relates to apparatuses and methods that may be useful in the fabrication of a part 10 having an embedded member 30. FIG. 7 provides a perspective view of the top side of a first illustrative embodiment of an embedded member 30 that may be used in accordance with the present disclosure. FIG. 12 provides a perspective view of a top side of a second illustrative embodiment of an embedded member 30 that may be used in accordance with the present disclosure. Although the present disclosure shows a specific number of specific embedded members 30 located at specific locations of the part 10, the scope of the present disclosure is in no way limited by the specific number, location, dimensions, and/or configuration of any of the embedded members 30 present in a specific embodiment of a part 10, fixture 20, and/or method used to fabricate a part 10.

Figure 9A:
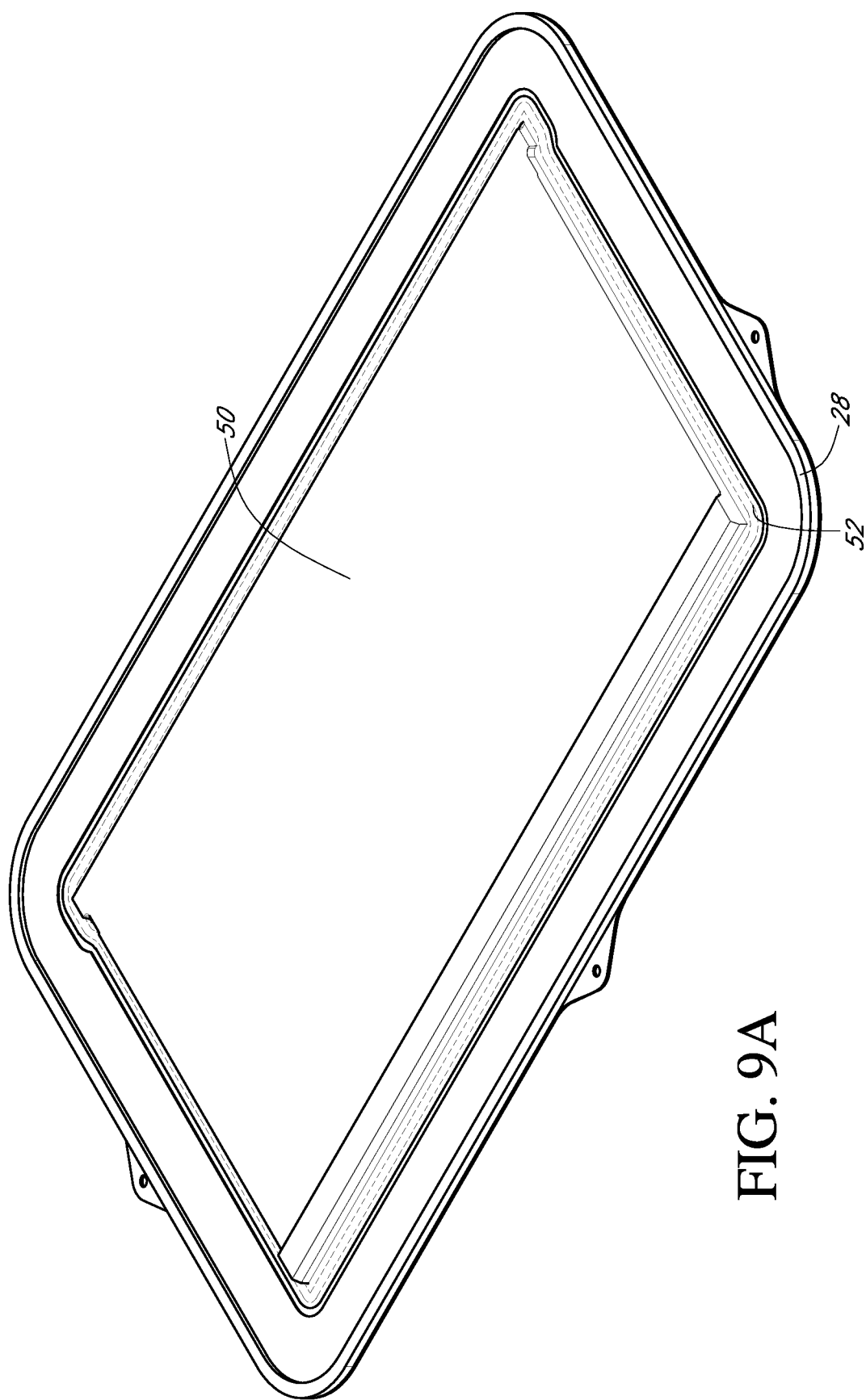
FIG. 9A is a perspective view of the fixture shown in FIGS. 1-6 with an outer member placed over the second layer of substrate lay-up.
Figure 14:
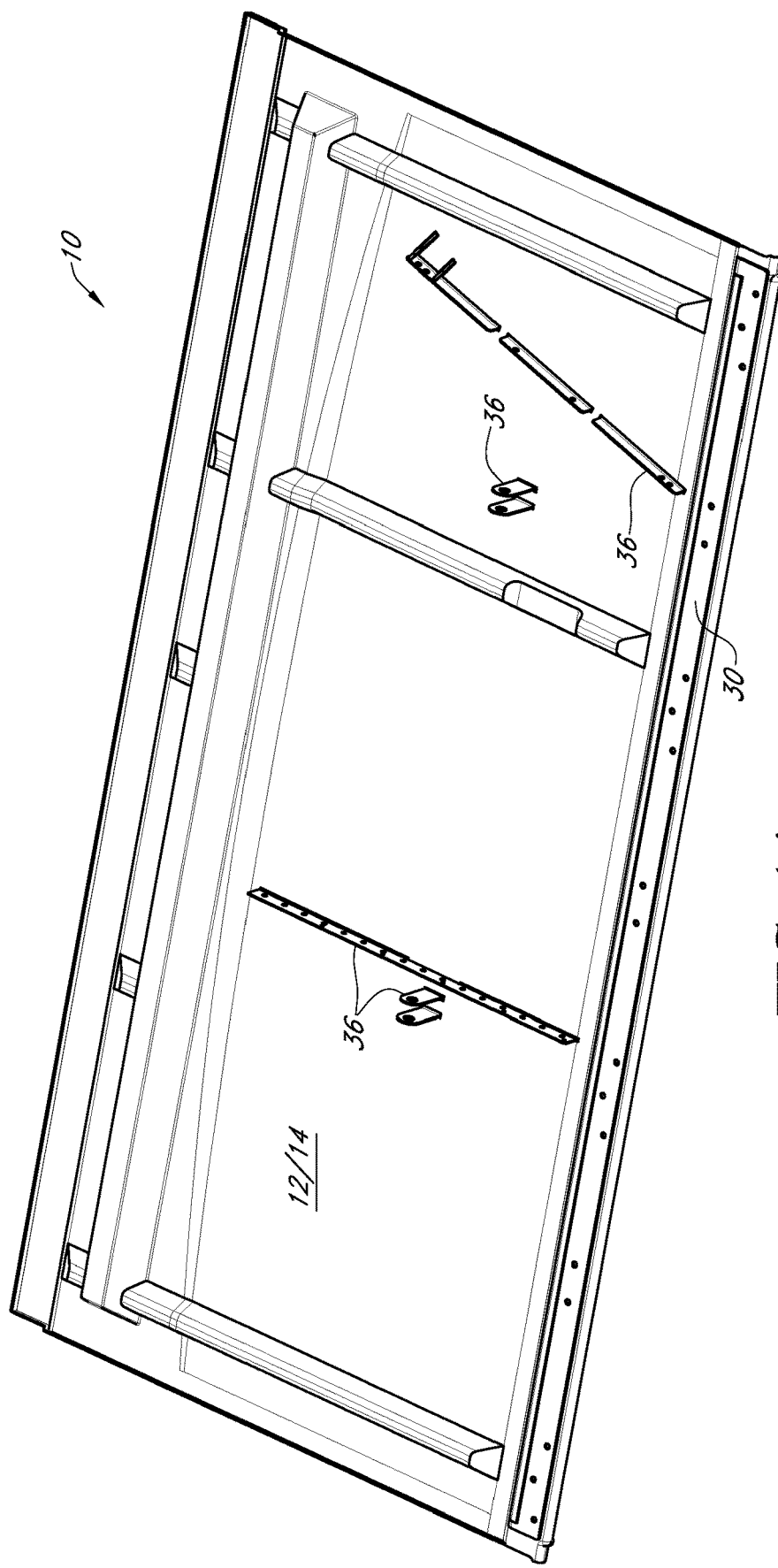
FIG. 14 is a perspective view of a first side of part having a plurality of embedded members extending therefrom.

In the illustrative embodiment, the part 10 may be formed with an outer member 50 (shown clearly in FIGS. 9 & 14)

on a surface thereof that may be visible at most times when the finished part 10 is in use, which surface may be referred to as the "A side" of the part 10, wherein the opposite surface may be referred to as the "B side" of the part 10. The part 10 may be a reinforced polymer composite, such as shown in the illustrative embodiment. Accordingly, the outer member 50 may be formed by any method that is appropriate for the application of the part 10, including but not limited to thermoforming, injection molding, or extrusion. Furthermore, the part 10 may be composed of any material that is suitable for the particular application of the part 10, including but not limited to polypropylene, polymethylmethacralate, polystyrene, abs, acrylic, polyethylene, or butadiene.

Figure 8:
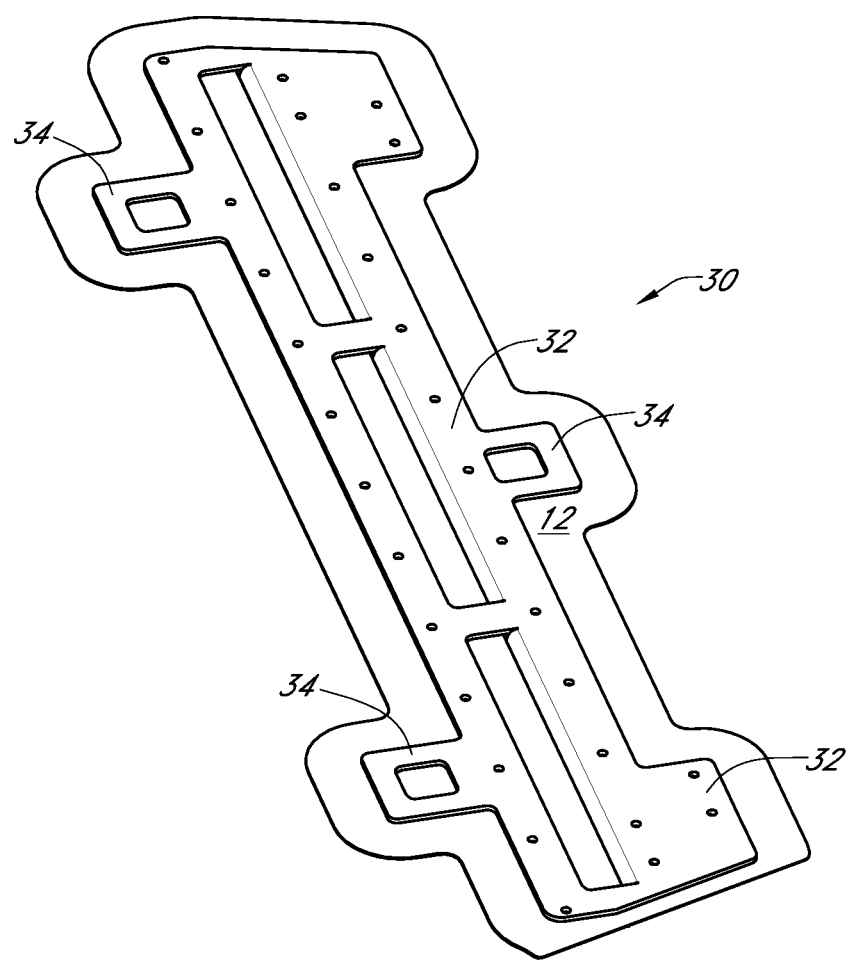
FIG. 8 is a perspective view of the bottom side of the embodiment of an embedded member with a portion of substrate lay-up positioned thereon from FIG. 7.

As shown in FIG. 7, the embedded member 30 may include a plurality of extending portions 36, which may be void of substrate lay-up 12. The opposite side of the embedded member 30 from FIG. 7 is shown in FIG. 8, which provides a perspective view of the bottom side of the first illustrative embodiment of an embedded member 30. Accordingly, the embedded member 30 may include a frame 32 and one or more ears 34. Substrate lay-up 12 configured to mimic the periphery of the frame 32 may be positioned on a first side of the frame 32 with openings to allow for any extending portions 36 of an embedded member 30.

Figure 13:
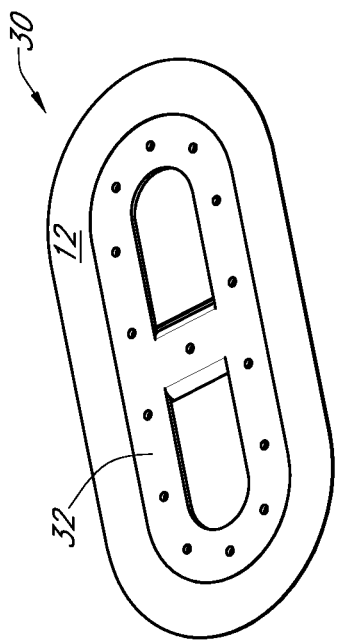
FIG. 13 is a perspective view of the bottom side of the embodiment of an embedded member with a portion of substrate lay-up positioned thereon from FIG. 12.

The bottom side of the second illustrative embodiment of an embedded member 30 is shown in perspective in FIG. 13. The second illustrative embodiment of an embedded member 30 may include at least one extending portion 36, which also may be void of substrate lay-up 12. Additionally, the second illustrative embodiment of an embedded member 30 may include a frame 32. As with the first illustrative embodiment of an embedded member 30, substrate lay-up 12 configured to mimic the periphery of the frame 32 and may be positioned on a first side of the frame 32 with openings to allow for any extending portions 36 of the embedded member 30.

A boot 38 may be placed over one or more extending portions 36 of an embedded member 30 as shown in FIG. 1. The illustrative embodiment of a boot 38 shown in FIG. 1 may be configured specifically for engagement with the first illustrative embodiment of an embedded member 30 shown in FIGS. 7 & 8, such that the boot 38 engages all extending portions 36 of that embedded member 30. The boot 38 may be configured to seat within a boot recess 24 formed in a fixture 20 on the main interior surface thereof, which surface may also be formed with one or more troughs 22 as further described below. Generally, a boot recess 24 may be formed as a depression, indentation, and/or other feature formed in the main interior surface of the fixture 20. In the illustrative embodiment of a fixture 20 pictured herein, each boot recess 24 generally is formed as a specifically sized and shaped indentation having a specific length, width, and depth at various positions of the indentation.

The seating of the boot 38 within a boot recess 24 of the fixture 20 allows the embedded member 30 to be located in the same position with respect to the part 10 in an extremely repeatable and precise manner, and may also eliminate the need for secondary attachment of additional fixtures, brackets, etc. as described below. A boot 38 may also prevent ingress and/or egress of resin 14, substrate lay-up 12, and/or other material from an area between the embedded member 30 and the boot 38 and/or from an area between the boot 38 and the fixture 20. It is contemplated that for many embodiments, the boot 38 may be constructed of a material that is generally impermeable to and/or inert with respect to the resin 14 and/or any other fluids, chemicals, etc. that may be required for fabricating the part 10. Such materials include but are not limited to silicone, polyurethane, other polymers and/or synthetic materials, natural rubber, fibrous materials, and/or combinations thereof.

The fixture 20 may also include one or more troughs 22 for additional embedded members 30. In the illustrative embodiment, some embedded members 30, such as those shown in FIGS. 7, 8, 12, and 13, may be formed of steel or other metallic alloys, and some may be formed of foam or other synthetic materials. However, the specific material of construction and/or configuration of any embedded member 30 in no way limits the scope of the present disclosure. Additionally, the fixture 20 may be constructed of any suitable material and/or combination thereof, including but not limited to cellulosic materials, polymer material, metals and their alloys, or other synthetic materials. The specific dimensions, positions, orientations, configurations, etc. of any embedded member 30 and/or fixture 20 (including but not limited to features thereof such as troughs 22, boot recesses 24, etc.) in no way limits the scope of the present disclosure. Although the various elements shown in the drawings and described herein are pictured to scale for a specific part 10, those elements may be differently configured for fabrication of a different part 10 without departing from the scope of the present disclosure.

Figure 2:
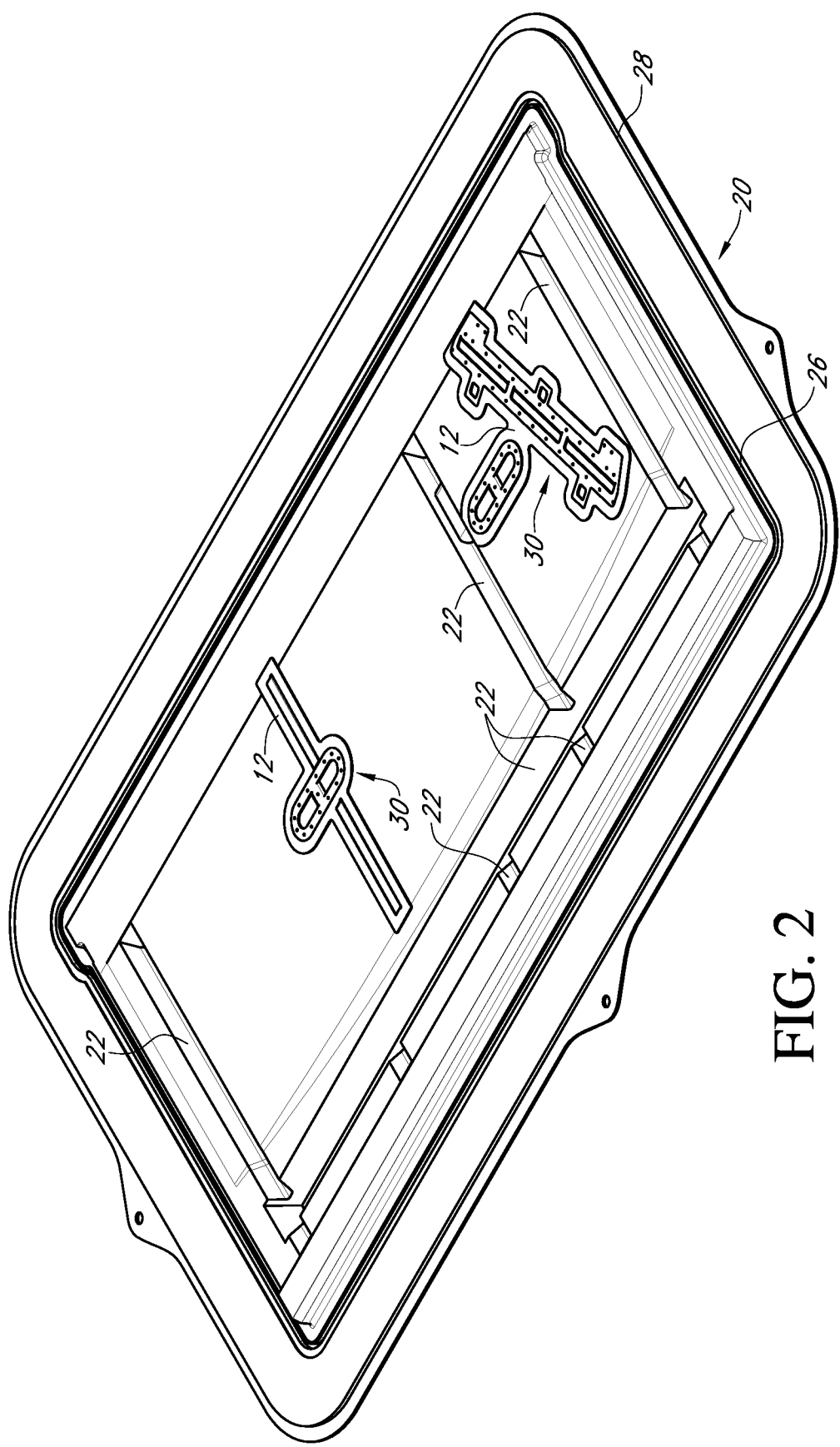
FIG. 2 is a perspective view of the fixture shown in FIG. 1 with a plurality of embedded members engaged therewith.
Figure 3:
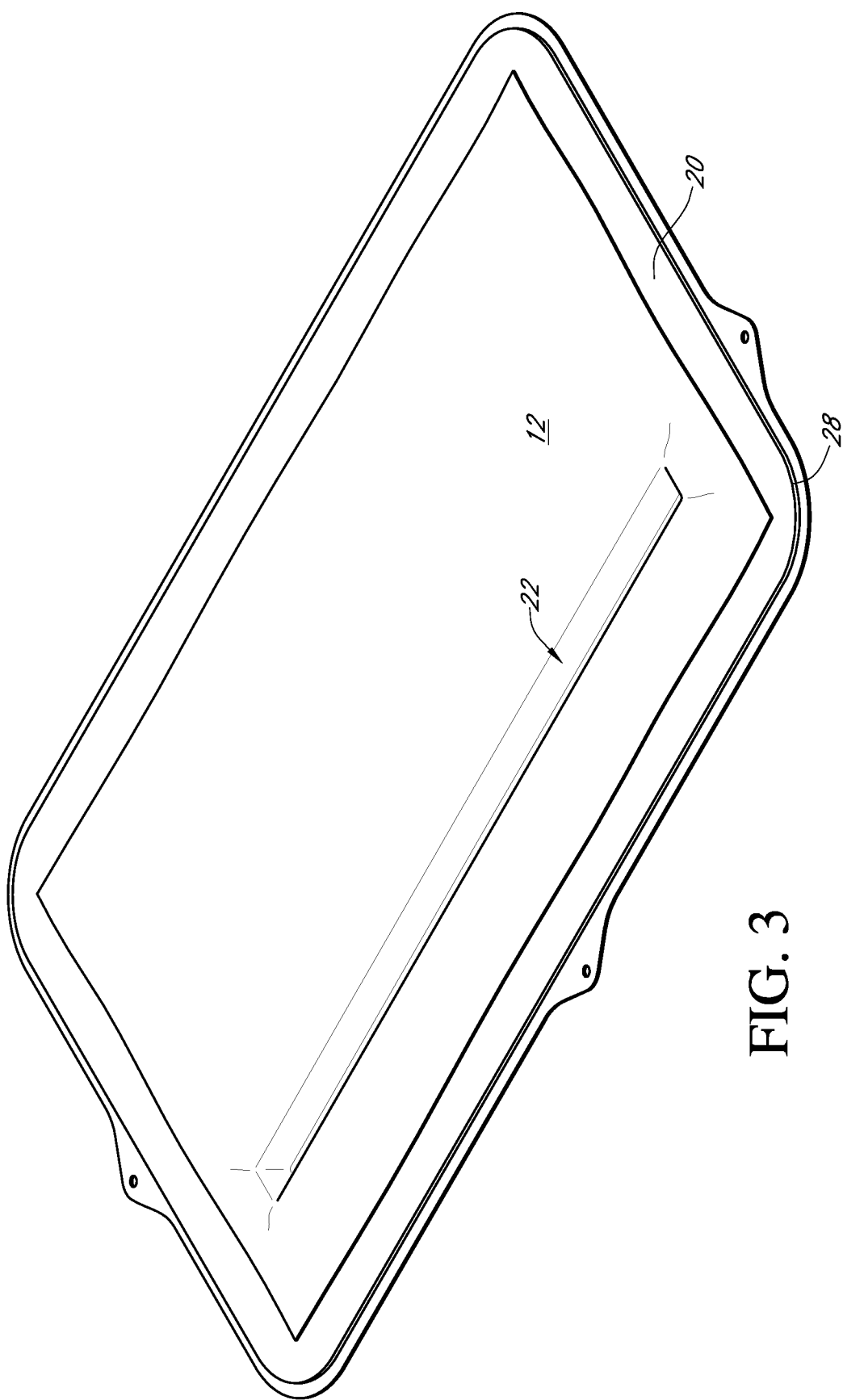
FIG. 3 is a perspective view of the fixture shown in FIGS. 1 & 2 with a first layer of substrate lay-up positioned over the plurality of the embedded members shown in FIG. 2.

In the illustrative embodiment, one or more embedded members 30 (some of which may have substrate lay-up placed adjacent one or more surfaces of the embedded member 30) may be positioned with respect to the fixture 20 via the boots 38 and boot recess 24, which is shown in FIG. 2. Next, a first layer of substrate lay-up 12 may be placed over the fixture 20 as shown in FIG. 3. In the illustrative embodiment of a part 10 as shown herein, it is contemplated that the surface of the part 10 that abuts the surface of the fixture 20 shown in FIG. 1 may constitute the B side of the part 10. However, the scope of the present disclosure is not so limited and extends to any surface of a part 10 constituting either the A side or B side.

Figure 4:
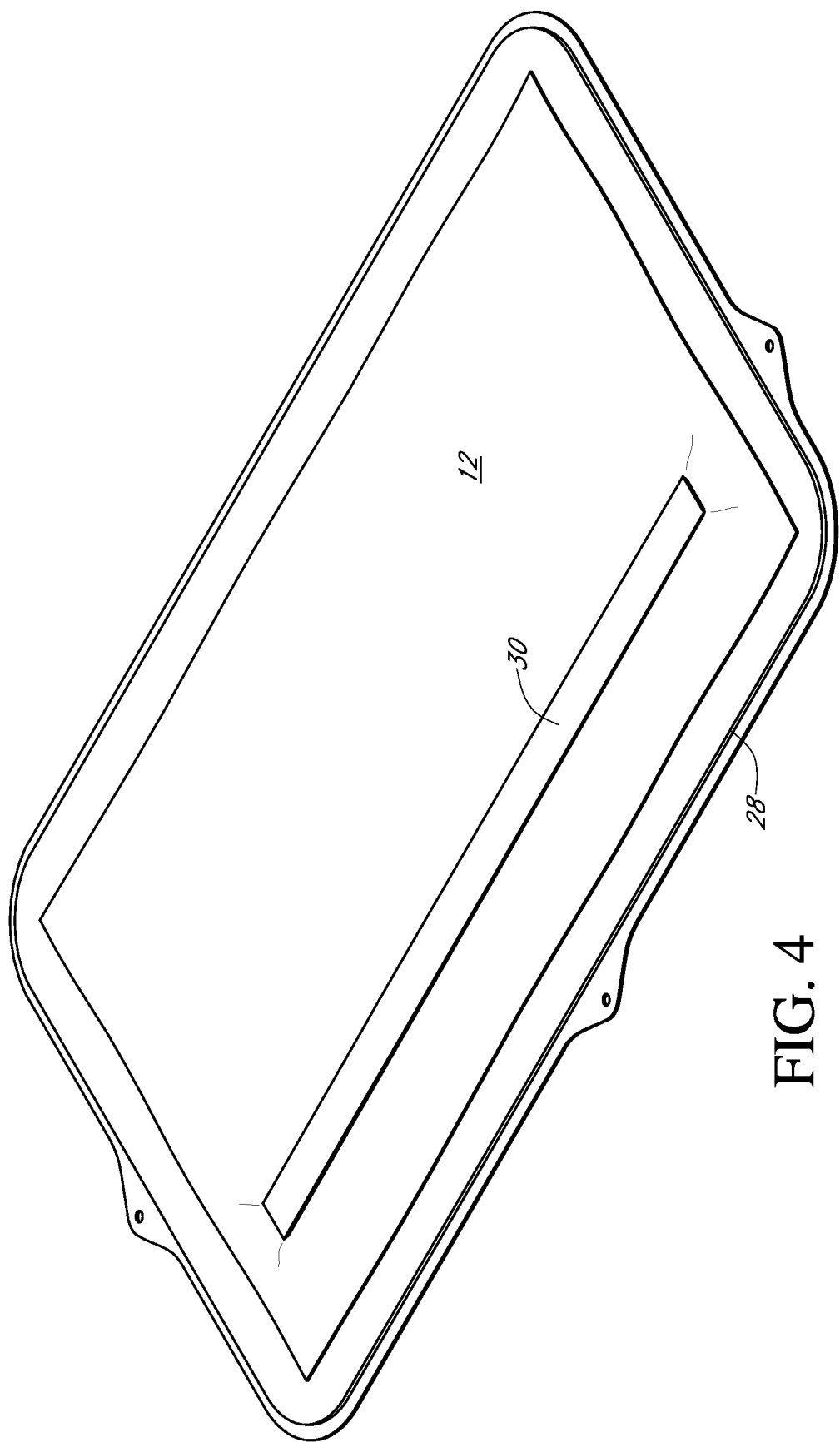
FIG. 4 is a perspective view of the fixture shown in FIGS. 1-3 with an embedded member positioned on top of the first layer of substrate lay-up.
Figure 5:
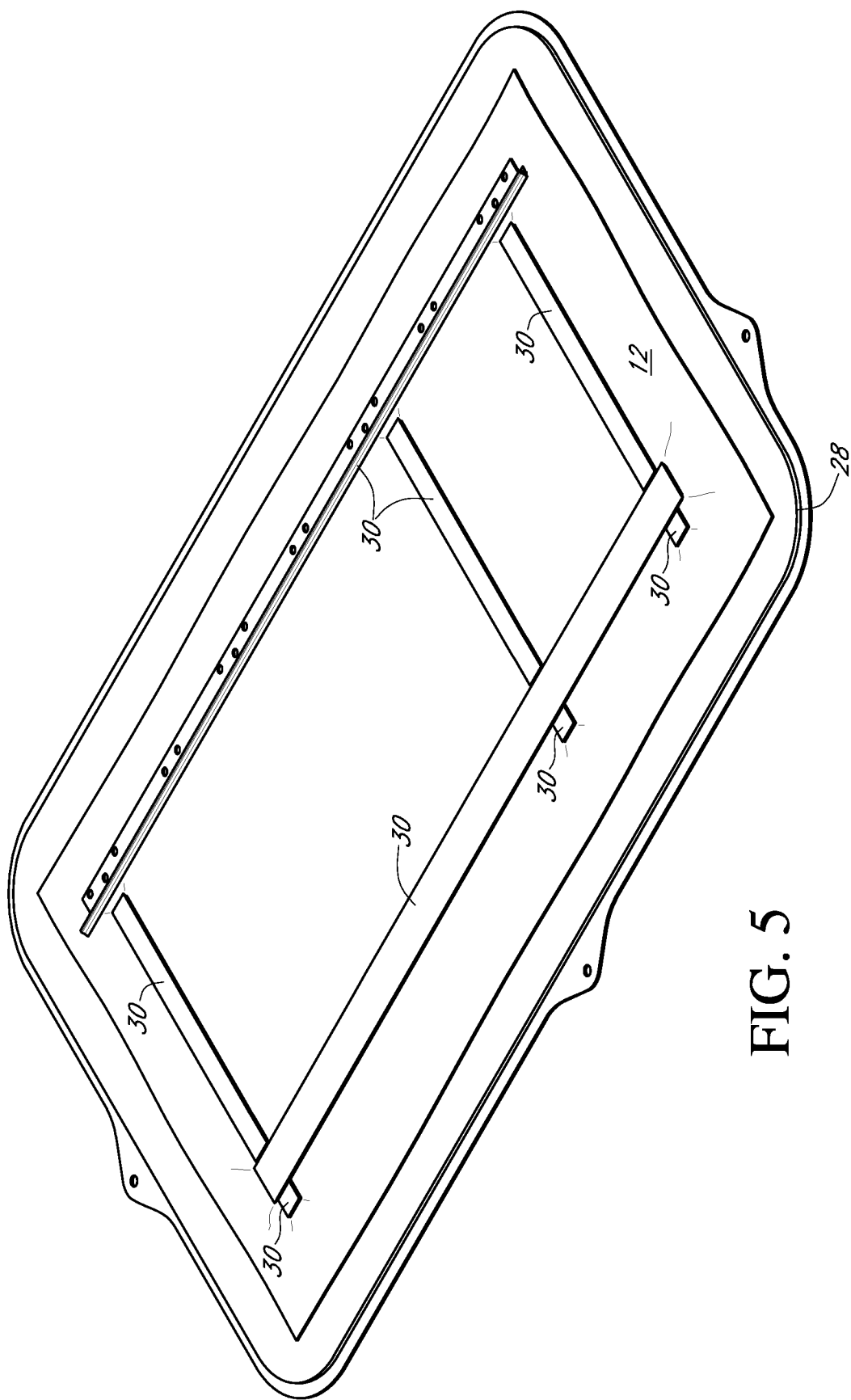
FIG. 5 is a perspective view of the fixture shown in FIGS. 1-4 with a second plurality of embedded members positioned on top of the first layer of substrate lay-up.

One or more additional embedded members 30 may be positioned with respect to the fixture 20 via one or more troughs 22 or other features formed in the fixture 20, as best shown in FIGS. 4 & 5. In the illustrative embodiment of a part 10, the embedded members 30 positioned in troughs 22 atop a first layer of substrate lay-up 12 may be constructed of a polymeric material, such as a synthetic foam (including but not limited to polystyrene, polypropylene, etc.) or other synthetic materials. However, as previously mentioned, the specific material of construction and/or configuration of any embedded member 30 in no way limits the scope of the present disclosure.

Figure 6:
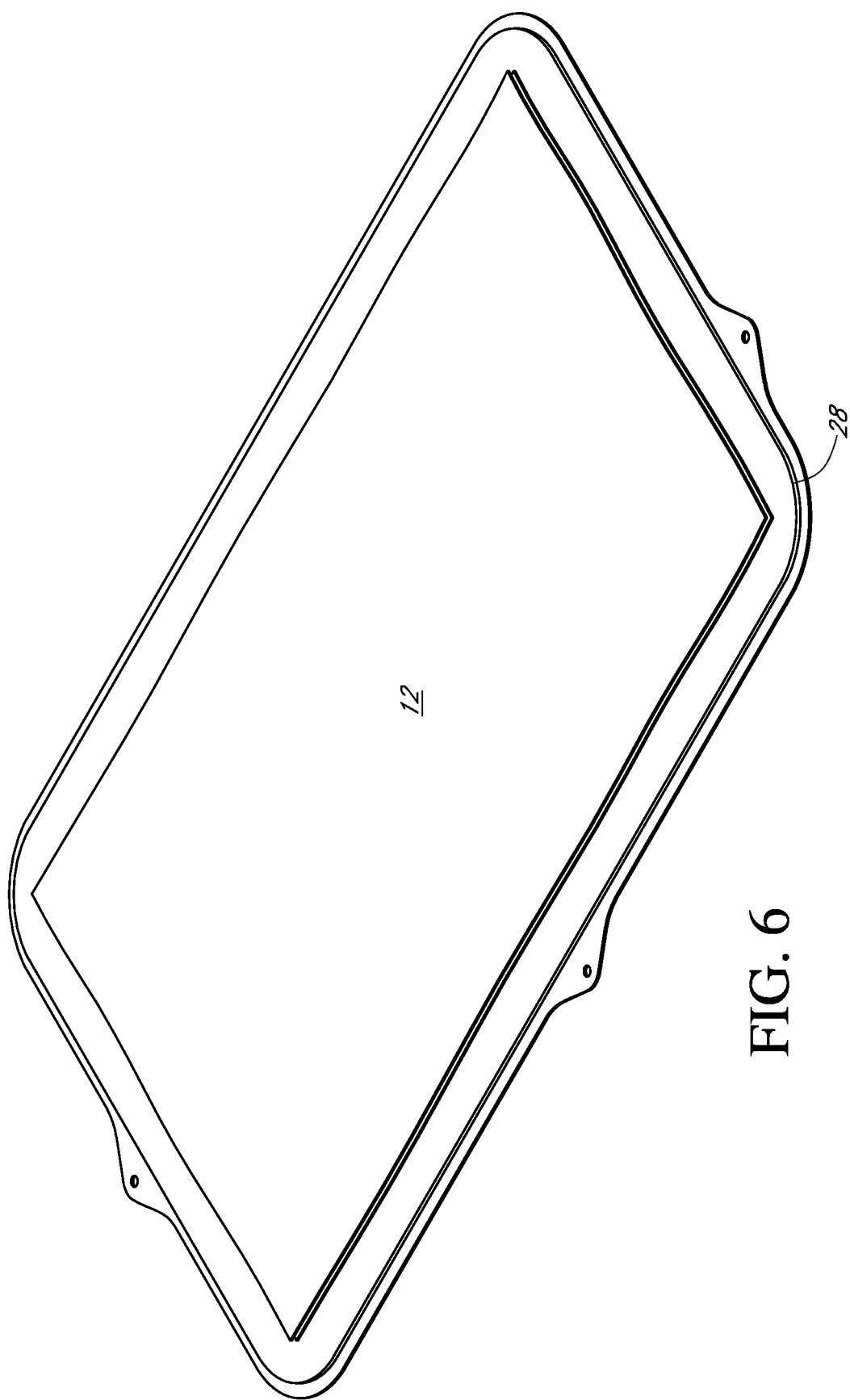
FIG. 6 is a perspective view of the fixture shown in FIGS. 1-5 with a second layer of substrate lay-up positioned over the second plurality of embedded members.

At this point, additional substrate lay-up 12 may be strategically positioned adjacent the first layer of substrate lay-up and/or embedded members 30. The positions of this additional substrate lay-up 12 will vary from one embodiment of a part 10 to the next, but in some embodiments the additional substrate lay-up 12 generally may be placed in areas of the part 10 that may need additional strength due to service factors. For example, in the illustrative embodiment of a part 10 it may be advantageous to place additional substrate lay-up adjacent one or more boot recesses 24. Finally, a second layer of substrate lay-up 12 may be positioned over the various embedded members 30 and/or additional substrate lay-up 12 to provide a smooth surface, as best shown in FIG. 6.

Figure 9B:
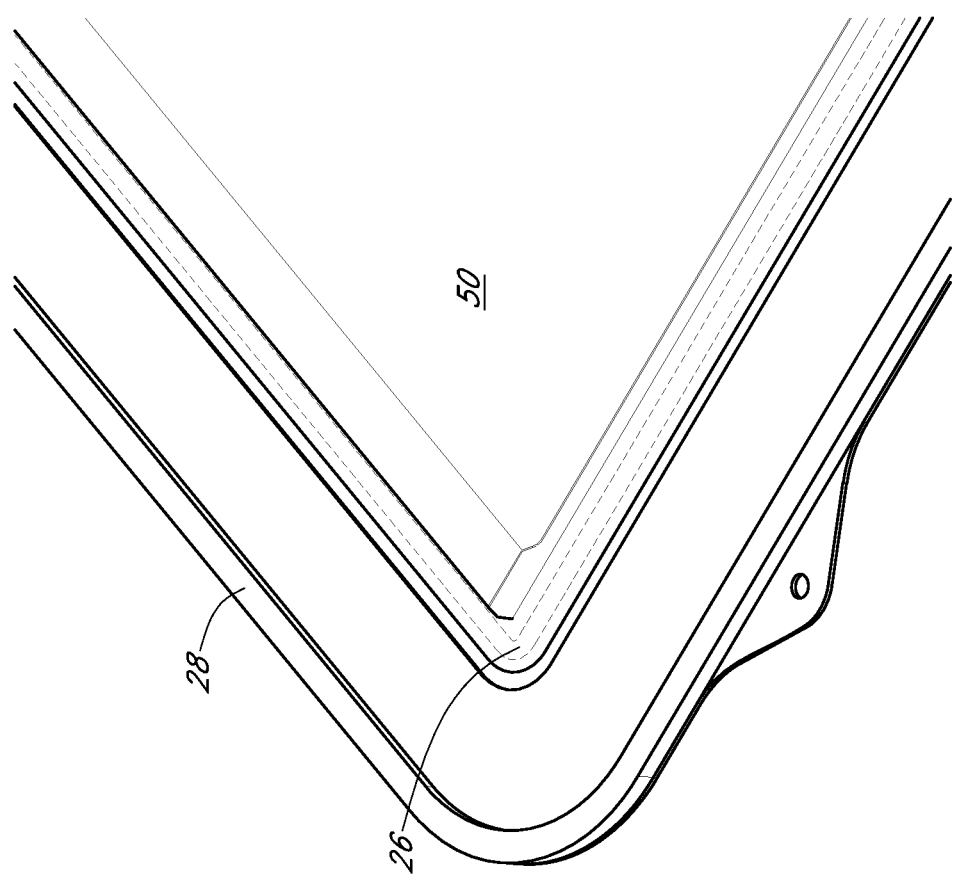
FIG. 9B is a detailed perspective view of a portion of the fixture shown in FIG. 9A.
Figure 10:
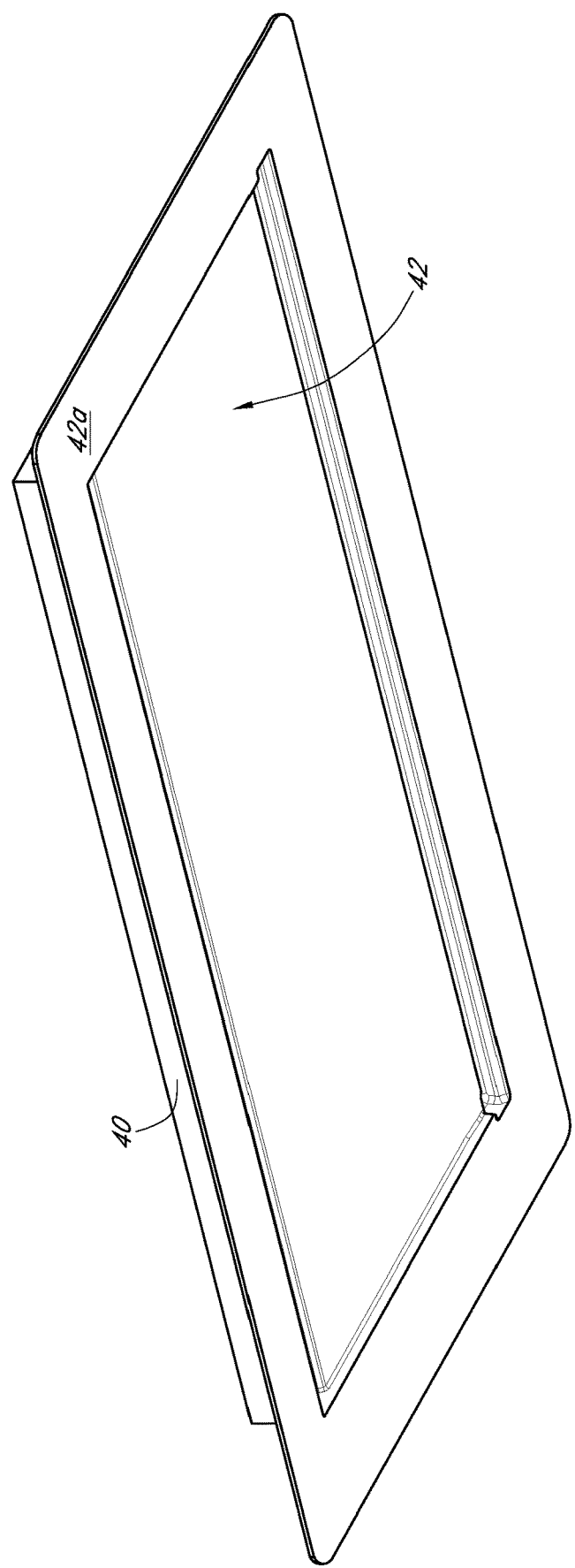
FIG. 10 is a perspective view of the interior portion of one embodiment of a cover that may be used with the illustrative embodiment of a fixture as disclosed herein.

After all required embedded members 30 and substrate lay-up 12 for a specific part 10 have been positioned on the fixture 20, an outer member 50 may be placed over the substrate lay-up 12. The outer member 50 may be formed with a flange 52 around the periphery thereof, as shown in FIGS. 9B & 12. It is contemplated that in the illustrative embodiment it may be desirable for the periphery of the flange 52 to extend beyond the periphery of the final layer of substrate lay-up 12 so that the area of the flange 52 void of any substrate lay-up 12 may form a resin gallery. Such a configuration may also serve to prevent resin 14 from contacting the exterior portion of the outer member 50, which may be required to meet certain aesthetic standards for the part 10, which standards may be especially important on the A side thereof. The flange 52, as shown in FIG. 9B, may extend to and/or slightly beyond an inner seal 26 of the fixture 20. The fixture 20 may also include an outer seal 28 beyond the inner seal 26 such that the periphery of the flange 52 may be positioned somewhere between the inner and outer seals 26, 28, respectively. In the illustrative embodiment, the substrate lay-up 12 may be positioned such that no substrate lay-up 12 is positioned beyond the inner seal 26 so as to facilitate the resin gallery. Consequently, the interface between the inner seal 26 and flange 52 may serve to prevent resin 14 from extending outward being that interface (i.e., to the outer seal 28).

After the outer member 50 has been properly positioned with respect to the fixture 20, a cover 40 may be placed over the outer member 50. The cover 40 interior surface 42 may be positioned adjacent the outer member 50. The cover 40 may be formed with a sealing portion 42a around the periphery thereof. The sealing portion 42a may correspond to the inner and outer seals 26, 28 of the fixture 20. Accordingly, when the cover 40 is positioned over the outer member 50, a vacuum pump fluidly connected to the area of the fixture 20 between the inner and outer seals 26, 28 may be used to urge the cover 40 toward the fixture 20, thereby sealing the space between the fixture 20 and the cover 40 from the external environment. Part of the sealing portion 42a may also engage the flange 52 of the outer member 50.

A vacuum pump (not shown) fluidly connected to the fixture 20 at an area between the inner and outer seals 26, 28 may be configured to provide a predetermined amount of vacuum force to that area (e.g., 15 psi less than ambient), which may be referred to as a first zone. Using plumbing (for example, such fluid handling elements that include but are not limited to pipes, tubes, fittings, etc.), the same vacuum pump may be fluidly connected to the fixture 20 interiorly with respect to the inner seal 26 and provide a different predetermined amount of vacuum force to that area (e.g., 10 psi less than ambient), which may be referred to as a second zone. Alternatively, different vacuum pumps and associated plumbing may be used to provide the desired pressure to either the first and/or second zones. Accordingly, the specific plumbing configuration, vacuum pumps, or amount of vacuum force in no way limits the scope of the present disclosure. It is contemplated that in some embodiments, the vacuum required for the first zone will simply serve to ensure that the cover 40 and fixture 20 remain properly positioned and sealed with respect to one another.

It is contemplated that for certain embodiments, it may be preferable for the vacuum pump connection for the second zone to be near the center of the fixture 20, such that after resin 14 is introduced, it migrates relatively evenly to that point. However, the optimal placement of the vacuum pump connection in either the first or second zones, and/or the number of vacuum pump connections in either the first or second zones will vary at least depending on the part 10 fabricated.

Figure 11:
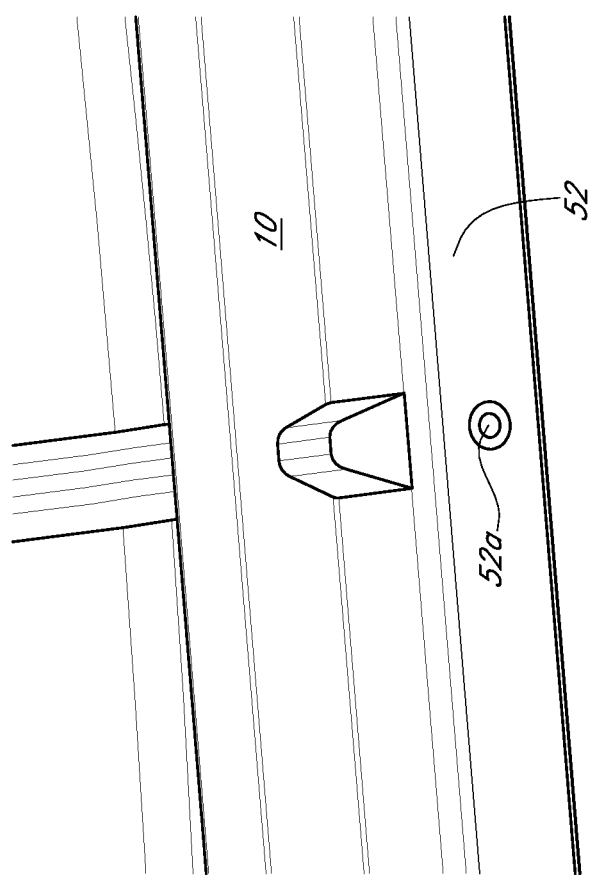
FIG. 11 is a detailed perspective view of a portion of the flange of the outer member after resin has been introduced to the substrate lay-up and cured.

Once the desired amount of vacuum has been achieved in the first and second zones, resin 14 may be introduced into the second zone via an inlet 23 formed in the fixture 20 adjacent to but interior with respect to the inner seal 26. It is contemplated that for certain parts 10, it may be beneficial to introduce the resin 14 adjacent the periphery of the part 10. In the illustrative embodiment, the resin 14 may be introduced in an area adjacent but interior with respect to the inner seal 26 such that the resin 14 is introduced adjacent the flange 52. A detailed view of one embodiment of a flange 52 and inlet location 52a for resin 14 is shown in FIG. 11. It is contemplated that no (or very little) substrate lay-up 12 may be positioned in the area in which resin 14 is introduced and around the periphery of the fixture 20 to facilitate rapid migration of resin 14 around the periphery of the fixture 20 to form a resin gallery.

From the resin gallery, it is contemplated that a pressure gradient in the second zone (which may be the result of a vacuum pump in fluid communication with the second zone) may be used to cause resin 14 to flow into the substrate lay-up 12 at a relatively even rate and with a relatively even volume distribution until resin 14 has contacted all or very nearly all substrate lay-up 12 positioned in the second zone. It is contemplated that the vacuum within the second zone may be focused at one or more suction points, which suction points may be in fluid communication with a vacuum pump with the second zone. It is further contemplated that the magnitude of the vacuum may be generally greater at these suction points, and that they may be positioned distant with respect to the inlet 23, such that resin 14 positioned in the resin gallery must traverse the maximum portion of the fixture 20 possible before reaching a suction point.

Alternatively, one or more inlets 23 may be configured adjacent an area proximate to the geometric center of the outer member 50 and/or in an area other than near the flange 52 of the outer member 50. In such a configuration, it may be advantageous to position one or more outlets 21, vacuum ports 64, and/or bag vacuum ports 74 proximate to an area near the flange of the outer member 50 such that when resin 14 is introduced, the resin 14 moves from an area approximate the center of the outer member 50 (i.e., adjacent to the location of the inlet(s) 23 or other resin introduction aperture) outward toward the flange 52 of the outer member. Accordingly, the specific and/or relative locations of resin 14 introduction (e.g., inlet 23, inlet location 52a, caul plate inlet 61a, and/or bag inlet 71a) and/or where a vacuum is connected (e.g., outlet 21, vacuum port 64, and/or bag vacuum port 74) in no way limits the scope of the present disclosure unless so indicated in the following claims.

In the illustrative embodiment of a part 10, the after the resin 14 has cured the area of the flange 52 adjacent the inlet 23 generally may constitute a portion of the resin gallery, which may be sacrificial to the part 10 and removed during finishing. It is contemplated that during the curing process, the temperature of the fixture 20 and/or cover 40 may be controlled for optimal cure of the resulting part 10. This will often require cooling of the fixtures 20 and/or cover 40, but the present disclosure is not so limited.

Figure 15:
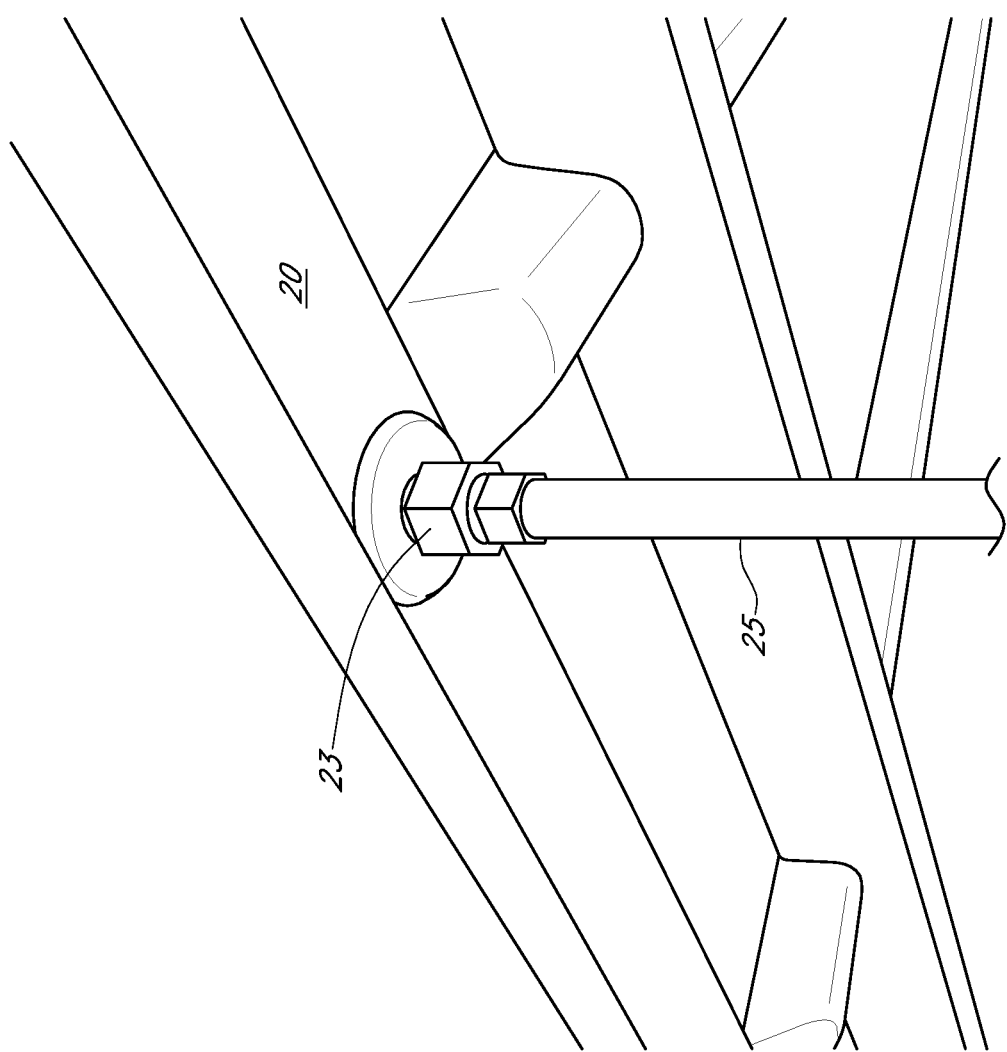
FIG. 15 is a detailed perspective view of a portion of the embodiment of a fixture adjacent the inlet.

One illustrative embodiment of an inlet 23 for a fixture 20 is shown in FIG. 15, wherein the inlet 23 is shown fluidly connected to a hose 25. The opposite end of the hose 25 may be in fluid communication with a resin supply (not shown) such that reduced pressure in the second zone of the fixture 20 causes resin 14 to migrate through the hose 25 and into the inlet 23, whereby the resin 14 may migrate to a resin gallery, which resin gallery may be generally adjacent to the inner seal 26 but interior with respect thereto.

After the part 10 has adequately cured and cooled, the vacuum may be removed from the first and second zones and the cover 40 may be removed from the fixture 20. The part 10 may then be removed from the fixture 20 and the boots 38 may be removed from any embedded member 30. Accordingly, the present disclosure provides an apparatus and method to form reinforced polymer parts 10 with embedded members 30 accurately positioned within the part 10 in a repeatable and precise manner. An illustrative embodiment of the B side of a part 10 (i.e., the surface of the part 10 without the outer member 50) is shown in FIG. 14, wherein the sacrificial portion of the flange 52 has been removed. The B side generally may be the surface of the part 10 that is adjacent the fixture 20 during fabrication. From FIG. 14 one may clearly observe a plurality of extending portions 36 of one or more embedded members 30, which extending portions 36 may be configured to protrude outward from the substrate lay-up 12/resin 14 medium. The substrate lay-up/resin 14 medium may constitute the majority of the volume and/or weight of the part 10 so as to constitute a body of the part 10, and may chemically bond/fuse to an interior surface of the outer member 50.

Other Aspects of a Frabrication Method an Apparatus

Referring now general to FIGS. 16-19, a part 10 having one or more embedded members 30 may be manufactured using a caul plate 60, bag 70, and outer member 50. In an aspect, a fixture 20 may not be required when employing a caul plate 60 and bag 70 during manufacturing of a part, but the scope of the present disclosure is not so limited unless so indicated in the following claims.

Figure 16:
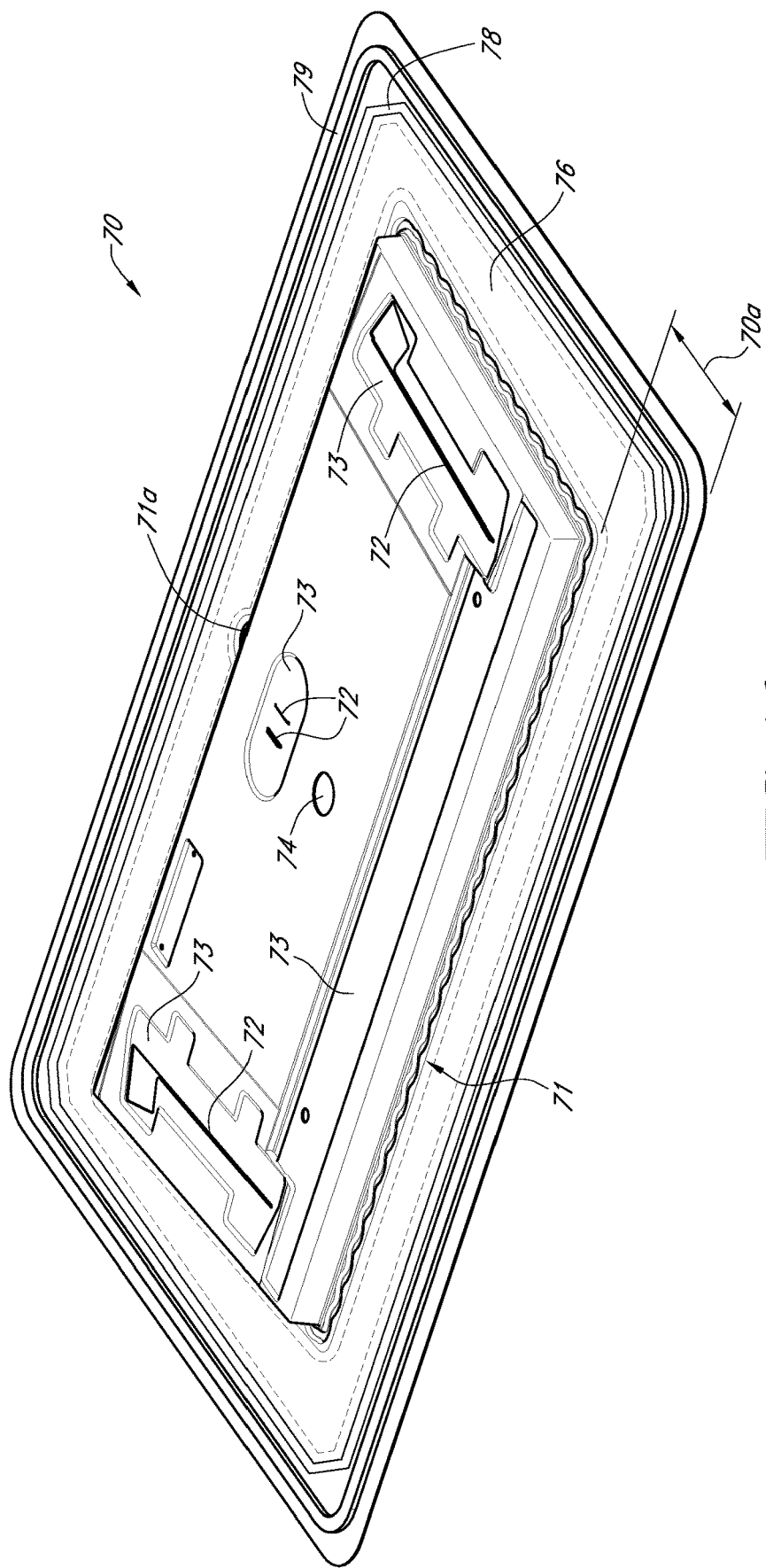
FIG. 16 is a perspective view of a bag that may be used with certain aspects of methods and apparatuses.

Referring now to FIG. 16 specifically, a bag 70 may comprise a certain amount of peripheral material 70a around the outside edge of the bag 70, and a bag border 71 between the peripheral material 70a and an interior portion of the bag 70. In one application it may be advantageous to impregnate a portion of the peripheral material 70a with a reinforcement material 76 inside the bag 70. The reinforcement material 76 may be configured as a mesh infused within a portion of the bag 70. The mesh may be made of a synthetic polymer (e.g., nylon) or a natural material (e.g., cellulose) without limitation unless so indicated in the following claims. Generally, the reinforcement material 76 may serve to prevent premature wear on the bag 70 that is adjacent the edge of the caul plate 60 during use as described in further detail below. Accordingly, the reinforcement material 76 may be configured as any method and/or structure achieving that purpose without limitation unless so indicated in the following claims. Such structures include, but are not limited to rigid or semi-rigid synthetic or natural materials, flexible synthetic or natural materials, and/or combinations thereof unless so limited in the following claims.

Figure 16A:
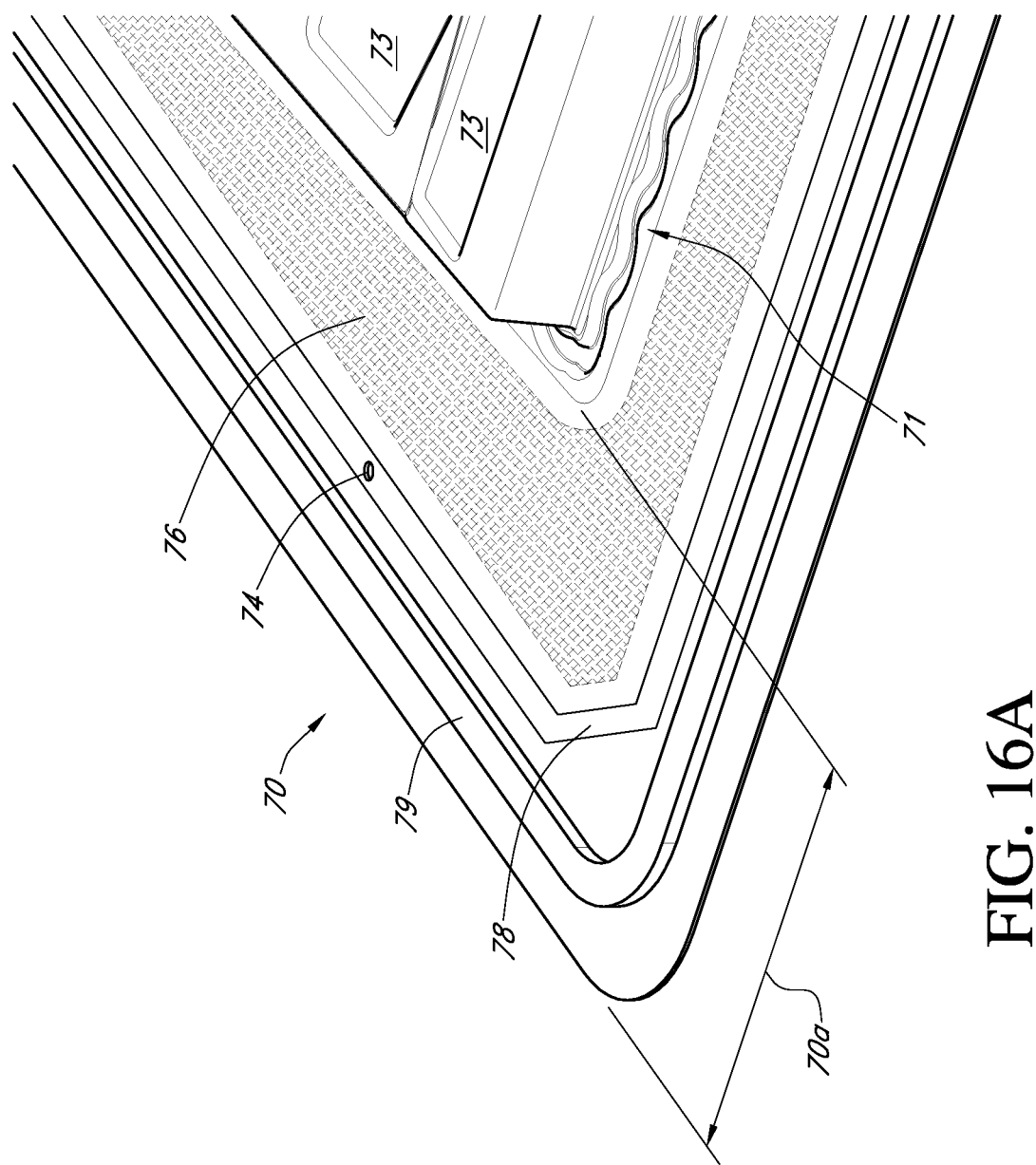
FIG. 16A is a detailed view of a portion of the bag from FIG. 16 having a reinforcement material therein.

A peripheral seal 79 may be formed around the outer periphery of the bag 70 and generally located in the peripheral material 70a, as shown in FIGS. 16 and 16A. The peripheral seal 79 may extend outward from the surface of the bag 70 to engage a sealing portion 42a of a cover 40 as described in further detail below. A vacuum trough 78 may be formed in the peripheral material 70a of the bag 70 around the periphery thereof, but in a position that is interior with respect to the peripheral seal 79. The vacuum trough 78 may be formed with one or more bag vacuum ports 74 therein, which bag vacuum ports 74 may serve to better achieve a hermetic seal between the bag 70 and cover 40 as discussed in further detail below. The vacuum trough 78 may be formed via removing a portion of the bag 70 such that the vacuum trough 78 constitutes an area on around the periphery of the bag 70 that is approximately 0.5 to 2.0 inches wide and approximately 0.05 to 0.9 inches deep. The vacuum trough 78 may serve to prevent localized vacuum pockets between the bag 70 and the cover 40 that might otherwise occur due to the flexible nature of the bag 70.

One or more bag inlets 71a may be formed in the bag border 71. Generally, it is contemplated that the bag inlet(s) 71a may correspond in relative size, position, and shape with one or more caul plate inlet(s) 61a. Generally, the bag inlet(s) may serve to pass resin 14 from an area external with respect to the bag 70 into to desired area of the part 10 (e.g., to the substrate lay-up 12). Accordingly, the bag inlet 71a may be formed as an aperture extending through the bag 70. The bag inlet 71a may be fortified with rigid and/or semi-rigid material around the aperture to prevent degradation due to forces that area may experience during use, at least some of which forces may be due to pressure differentials. One type of rigid and/or semi-rigid material is shown in FIG. 15 surrounding the inlet 23.

The caul plate inlet(s) 61a may serve to properly locate the bag inlet(s) 71a with respect to the caul plate 60, and the outer diameter of any reinforcing portion of the bag inlet 71a may seat within the inner diameter of the caul plate inlet 61a. However, the scope of the present disclosure is not so limited unless indicated in the following claims. An interior portion of a bag 70 (interior with respect to the bag border 71) may comprise one or more seats 72, one or more bag contours 73, and/or one or more bag vacuum ports 74. A bag vacuum port 74 may be positioned in approximately the center of the bag 70, but the specific location of a bag vacuum port 74 in no way limits the scope of the present disclosure unless so indicated in the following claims.

It is contemplated that the various seats 72 formed in the bag 70 may be positioned and/or configured to engage one or more specific embedded members 30 for a certain part 10. For example, in an aspect each seat 72 formed in the bag 70 shown in FIG. 16 may engage an extending portion 36 of a specific embedded member 30, such as those shown in FIGS. 7A and 12A. Additionally, in an aspect the various seats 72 and/or bag contours 73 formed in the bag 70 may correspond to one or more apertures 62 and/or contours 63 formed in a caul plate 60 for use with a bag 70, as described in further detail below, and without limitation unless so indicated in the following claims. In an aspect, the bag 70 may be constructed from a silicon-based material, such that the bag 70 may be generally flexible but simultaneously retain the dimensions, relative positions, configurations, etc. of certain features of the bag 70 (e.g., the bag border 71, bag inlet 71a, seat(s) 72, bag contour(s) 73, bag vacuum port(s) 74, etc.). Further, silicon-based material may provide the bag 70 with an imperviousness and/or inertness to resin 14. However, the bag 70 may be constructed of any suitable material without limitation unless so indicated in the following claims, including any reinforcement material 76 positioned therein.

Figure 17A:
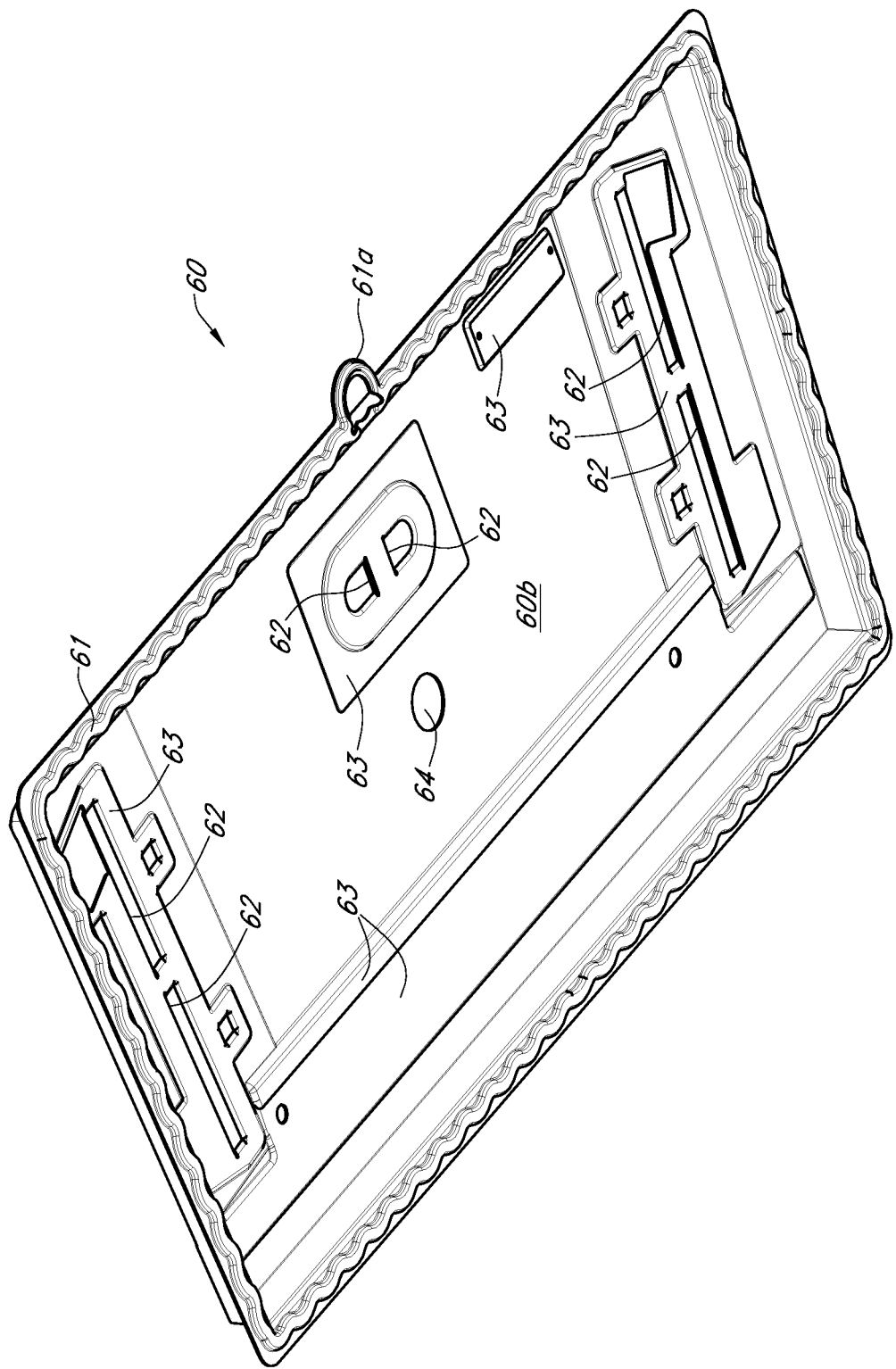
FIG. 17A is a perspective view of bag side of a caul plate that may be configured to correspond to the surface of the bag shown in FIG. 16.
Figure 17B:
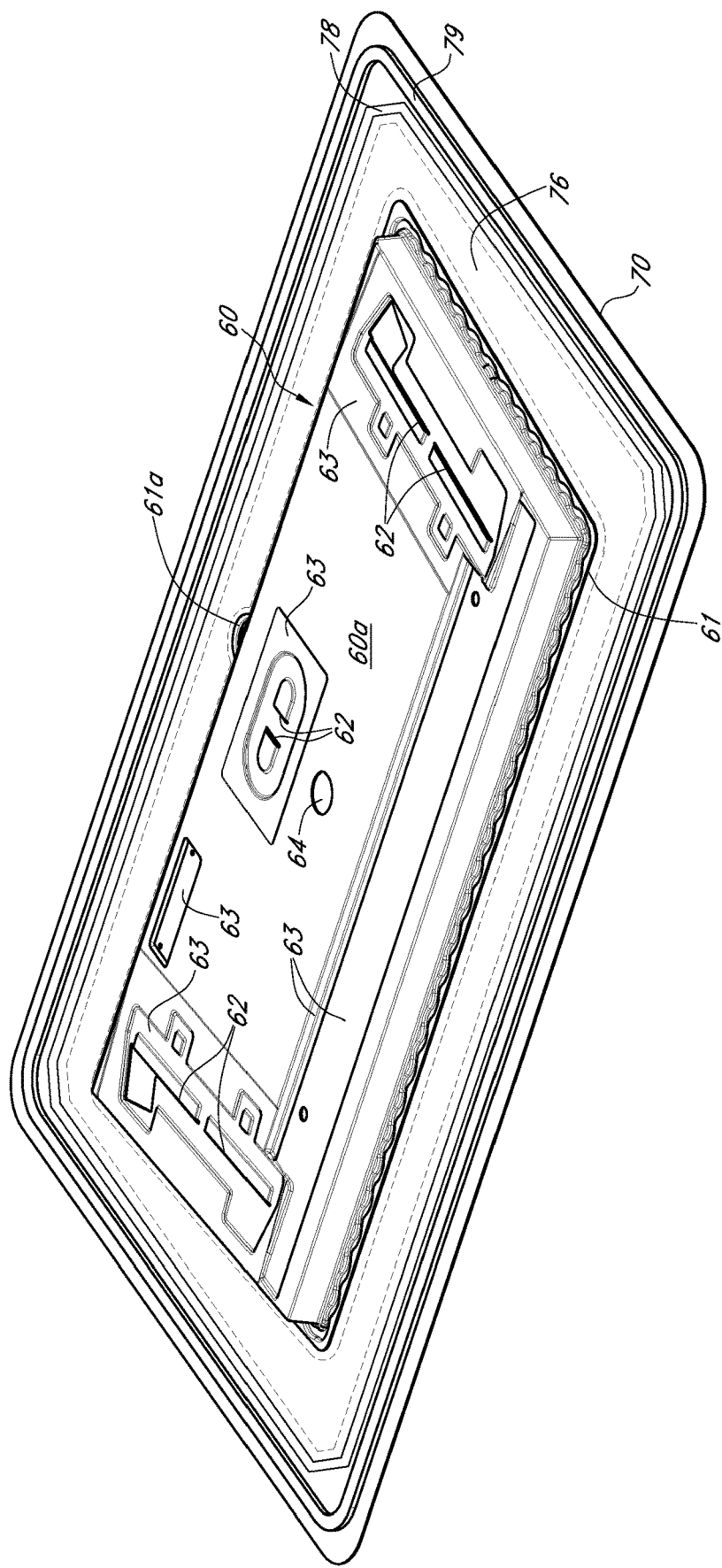
FIG. 17B is a perspective view of the resin side of caul plate from FIG. 17A engaged with the bag from FIG. 16.

Referring now to FIGS. 17A & 17B, a caul plate 60 may comprise a border 61 around the periphery thereof, and one or more caul plate inlets 61a may be formed therein. An interior surface of a caul plate 60 is shown in FIG. 17A (which may be referred to herein as the "bag side 60b"), and it is contemplated that in an aspect the bag side 60b of the caul plate 60 may be positioned immediately adjacent a bag 70 or portion thereof during use. An exterior surface (or resin side 60a) of a caul plate 60 is shown in FIG. 17B, and it is contemplated that in an aspect the resin side 60a of the caul plate 60 may be positioned adjacent a frame 32 of an embedded member 30, another portion of an embedded member 30, and/or a portion of substrate lay-up 12 at certain points during use. It is contemplated that the caul plate 60 and bag 70 show in FIGS. 16-18 may be configured to produce a part 10 that is similar and/or nearly identical to the part 10 previously described in reference to FIGS. 1-15. Accordingly, the caul plate 60 may be configured with a contour 63 having to apertures 62 therein to accommodate an embedded member 30 like that shown in FIG. 12A, a contour 63 and two apertures adjacent and thereof, and one or more elongate contours 63 adjacent an edge thereof. The bag 70 may be formed with corresponding seats 72 and/or bag contours 73. However, the scope of the present disclosure is not so limited, and the methods and apparatuses described herein may be employed to manufacture any part 10 without limitation unless so indicated in the following claims.

The caul plate 60 may be formed with one or more apertures 62 on an interior portion thereof (interior with respect to the border 61 of the caul plate 60). The apertures 62 in the caul plate 60 may correspond in relative position and in at least one dimension to one or more seats 72 formed in the bag 70, and may extend through the caul plate 60 from the resin side 60a to the bag side 60b. In an aspect, an embedded member 30 may be positioned with respect to the caul plate 60 such that a portion of an embedded member 30 (e.g., an extending portion 36) may pass through an aperture 62 and engage a seat 72 formed in the bag 70. Another portion of an embedded member 30 (e.g., a frame 32) may be positioned on the resin side 60a of the caul plate 60. The caul plate 60 may be formed with a vacuum port 64, which may be positioned and/or sized to correspond to the bag vacuum port 74 such that the vacuum port 64 is in fluid communication with the bag vacuum port 74.

Generally, the reinforcement material 76 may extend from an area interior with respect to the vacuum trough 78 of the bag 70 to an area at or interior with respect to the bag border 71. It is contemplated that in such a configuration the reinforcement material 76 may be infused into the bag 70 at all positions that the bag 70 contacts an edge of the caul plate 60 (e.g., the border 61 of the caul plate 60), which edges may be generally configured as right angles. However, reinforcement material 76 may be differently positioned without limitation unless so indicated in the following claims. Additionally, in certain applications reinforcement material 76 may not be required depending at least upon the materials of construction for the caul plate 60, bag 70, configuration of the edges of the caul plate 60, and/or combinations thereof without limitation unless so indicated in the following claims.

In an aspect, one or more boots 38 (which boots 38 may be configured and/or employed in a manner similar to that as previously described above) may be employed with a bag 70 and a caul plate 60. In such a configuration, a boot 38 may engage all or part of an extending portion 36 of an embedded member 30. In such an aspect, a corresponding seat 72 in the bag 70 may be configured to engage an exterior surface of the boot 38 (and in certain aspects, simultaneously engage a portion of the embedded member 30) rather than only a portion of the embedded member 30. In such a configuration, the seat 72 corresponding to a boot 38 may resemble a bag contour 73 without limitation unless so indicated in the following claims. It is contemplated that utilizing boots 38 may extend the life of a bag 70 used with certain configurations of embedded members 30 (and/or extending portions 36 thereof).

The caul plate 60 may be formed with one or more contours 63 therein. In an aspect, it is contemplated that the border 61, caul plate inlet(s) 61a, contour(s) 63, and/or vacuum port(s) 64 may correspond in configuration (e.g., size and/or shape) and/or relative position to the bag border 71, bag inlet(s) 71a, bag contour(s) 73, and/or bag vacuum port(s) 74. Further, it is also contemplated that the various aperture(s) formed in the caul plate 60 may correspond in configuration and/or relative position to the seat(s) 72 formed in the bag 70 as previously described.

In an aspect, the border 61 of the caul plate 60 may be formed with a wave feature, and the bag border 71 may be formed with a corresponding wave feature and one or more caul plate inlets 61a, which may be positioned on each side of the border 61, or which may be just on one edge thereof without limitation unless so indicated in the following claims. As shown, the wave feature may be configured generally as a sinusoidal wave, wherein the wave feature may be a smooth, oscillating series of peaks and troughs having a uniform amplitude and wavelength. However, other wave features may be used within the scope of the present disclosure. Accordingly, other wave features may be used without departing from the scope of the present disclosure unless so limited in the following claims. Additionally, the border 61 may be formed with other features to increase the strength and/or rigidity of the border 61 of the caul plate. Such features include but are not limited to triangle features, rectangle features, circular features, and/or combinations thereof unless so indicated in the following claims.

It is contemplated that such a feature formed in a border 61 may provide the caul plate 60 with a desired amount of structural rigidity when subjected to reduced pressure from a vacuum pump as described in detail below. The caul plate inlet 61a may be formed as a type of loop, and may be configured to provide a place for a user to engage a caul plate 60 to manipulate the position thereof (or for any other reason without limitation unless so indicated in the following claims) without fear of damaging the caul plate 60 in a way that might degrade the performance thereof during fabrication of a part 10. However, the optimal number, configuration, dimensions, etc. of the border 61, caul plate inlets 61a, aperture(s) 62, contour(s) 63, vacuum port(s) 64, peripheral material 70a, bag border 71, bag inlets 71a, seat(s) 72, bag contour(s) 73, bag vacuum port(s) 74, reinforcement material 76, vacuum troughs 78, and/or peripheral seals 79 may vary from one application of the present disclosure to the next and may be dependent at least on configuration of the part 10 to be produced. Accordingly, those constraints are in no way limiting to the scope of the present disclosure unless so indicated in the following claims.

In an aspect, the caul plate 60 may be constructed from a thermoplastic olefin or olefinic thermoplastic elastomer, such that the caul plate 60 may be semi-rigid, such that the caul plate 60 may be deformed to a degree under a predetermined amount of force applied to the caul plate 60 in a certain manner (unlike hard or rigid tooling), but such that the caul plate 60 may simultaneously provide the structural rigidity needed to properly form the part 10 for which the caul plate 60 is designed. In such a construction the caul plate 60 may retain the dimensions, relative positions, configurations, etc. of certain features of the caul plate (e.g., border 61, caul plate inlet 61a, aperture(s) 62, contour(s) 63, vacuum port(s) 64). However, the caul plate 60 may be constructed of any suitable material without limitation unless so indicated in the following claims.

In an aspect shown at least in FIG. 18, the bag 70 and/or caul plate 60 may be supported via a support base 16. The support base 16 may be configured to provide the required support for the caul plate 60, bag 70, all other elements required for a specific part 10 (e.g., embedded members 30, substrate lay-up 12, resin 14, etc.), outer member 50, and/or cover 40. In another aspect, the cover 40 and outer member 50 may be configured such that they are positioned below the caul plate 60 and bag 70, such that a support base 16 is not required or is engaged with a cover 40 to elevate the cover 40 from a flooring surface. Accordingly, the relative elevation of the various components with respect to one another as well as the inclusion of a support base 16 in no way limit the scope of the present disclosure unless so indicated in the following claims.

Figure 19:
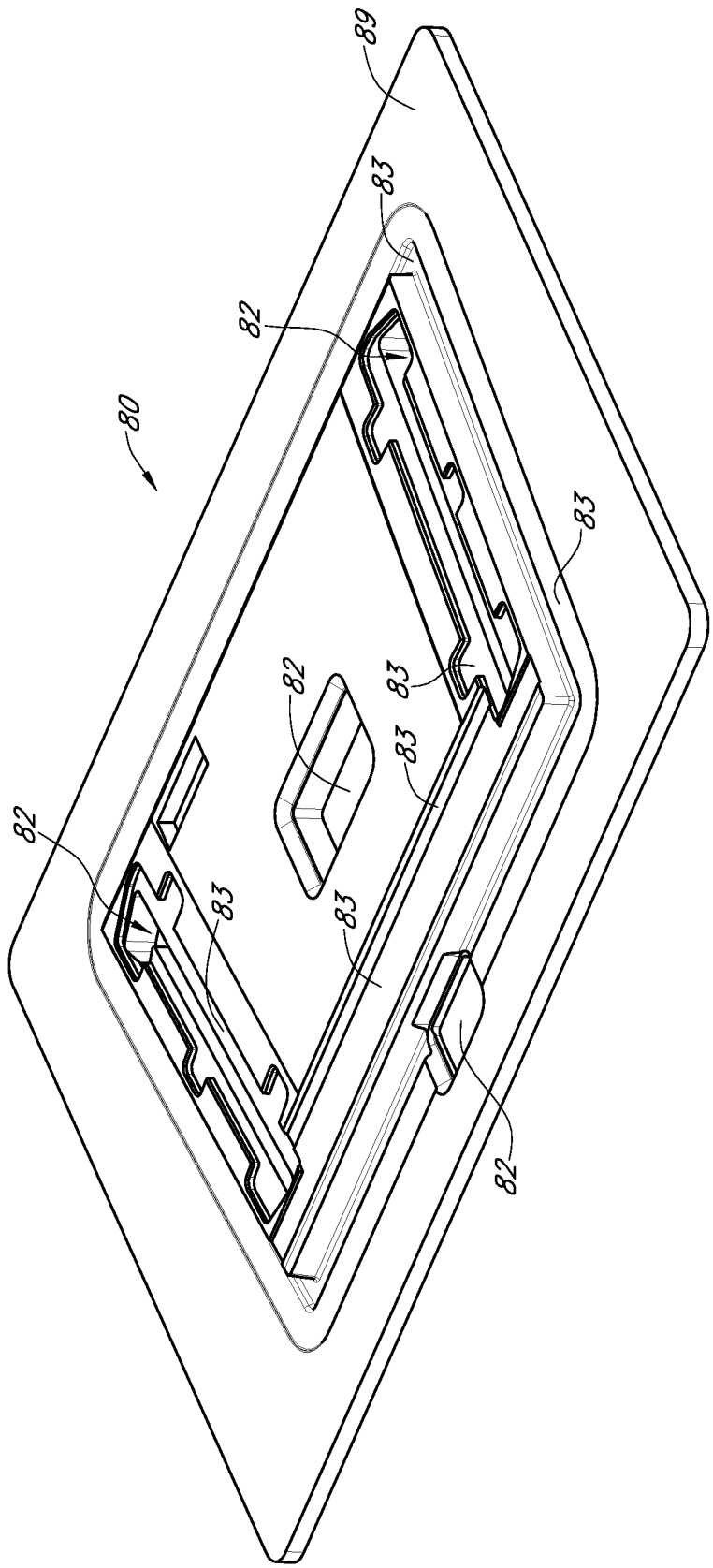
FIG. 19 is a view of one embodiment of a support base that may be used with the present method.
Figure 19A:
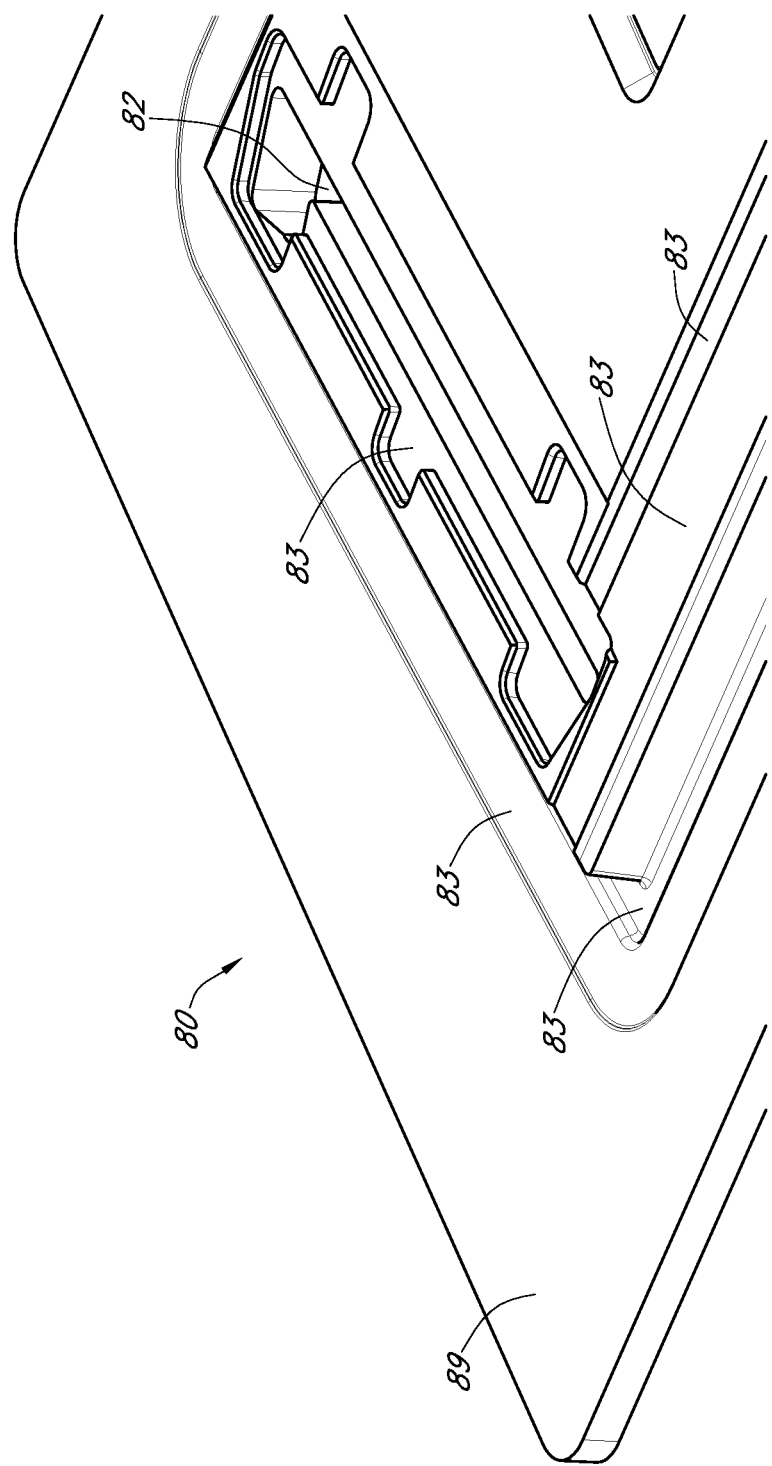
FIG. 19A is a detailed view of a portion of the support base shown in FIG. 19A.

In another aspect shown at least in FIG. 19, the bag 70 and/or caul plate 60 may be supported via a table 80. The table 80 may be configured to provide the required support for the caul plate 60, bag 70, all other elements required for a specific part 10 (e.g., embedded members 30, substrate lay-up 12, resin 14, etc.), outer member 50, and/or cover 40. The table 80 may be formed with one or more table contours 83 and/or one or more table cavities 82 on a top surface thereof, which top surface may be positioned adjacent a bag 70 during use. It is contemplated that the table contour(s) 83 may be configured such that they correspond to the bag contour(s) 73 in relative shape, size, and position. It is further contemplated that the table cavities 82 may be configured such that they correspond to the seats 72 of the bag 70 in relative shape, size, and position. In such a configuration, a table 80 may provide a support structure for the bag 70 (and/or other elements positioned above the bag 70) while simultaneously preventing/mitigating inadvertent movement of the bag 70 via engagement of one or more seats 72 with one or more table cavities 82 and/or via engagement of one or more bag contours 73 with one or more table contours 83. In this manner, the upper surface of the table 80 (which may contact a lower surface of the bag 70 during use) may be configured to correspond with the configuration of the bag 70 such that the bag 70 nests against the table 80. However, the table 80 and/or bag 70 may be differently configured without limitation unless so indicated in the following claims.

Generally, at least one table contour 83 may be configured to correspond with the flange 52 of an outer member 50, such that the periphery of the flange 52 is approximately the same size and shape of a table contour 83 positioned around the periphery of the table 80. In such a configuration, the outer member 50 may seal firmly against the bag 70 within a peripherally positioned table contour 83, and that table contour 83 may aid in proper positioning and/or inadvertent movement of an outer member 50 with respect to the caul plate 60, bag 70, and/or table 80.

Additionally, at least one table contour 83 may be configured to correspond with the border 61 of the caul plate 60, such that the periphery of the caul plate 60 is approximately the same size and shape of a table contour 83 positioned around the periphery of the table 80. In such a configuration, caul plate 60 may seal firmly against the bag 70 within such a table contour 83, and that table contour 83 may aid in proper positioning and/or inadvertent movement of the caul plate 60, bag 70, and/or table 80. It is contemplated that the table contour 83 configured as approximately the same size and shape of the periphery of the caul plate 60 may be positioned interiorly with respect to the table contour 83 configured as approximately the same size and shape of the periphery of the flange 52.

Illustrative Method of Using a Caul Plate and Bag

One illustrative method of using a caul plate 60 and bag 70 will now be described. Although the description of the method makes reference to various apparatuses previously described above, the scope of the disclosure is not so limited unless indicated in the following claims. It is contemplated that many of the steps described below will be analogous to those previously described for a method utilizing the apparatuses shown in FIGS. 1-15, but the scope of the disclosure is not so limited unless indicated in the following claims.

In an aspect, when using the caul plate 60, bag 70, and table 80 shown in FIGS. 16-19A, firstly, a bag 70 may be positioned adjacent a table 80. The various seats 72 of the bag 70 and bag contours 73 may be properly positioned with respect to the various table cavities 82 and/or table contours 83, respectively. Next, a caul plate 60 may be positioned adjacent the bag 70, such that a resin side 60a of the caul plate 60 is accessible, and the bag side 60b of the caul plate 60 is positioned adjacent the bag 70. The various aperture(s) 62 and/or contour(s) 63 formed in the caul plate may be properly positioned with respect to the various seats 72 and/or bag contour(s). Additionally, the border 61 (and any features thereof) of the caul plate 60 may properly positioned with respect to the bag border 71 (and any bag inlet(s) 71a). It is contemplated that the border 61 of the caul plate 60 may physically contact the bag 70 at a portion thereof (which may be peripheral material 70a of the bag 70) that has reinforcement material 76 infused therewithin.

At this point, substrate lay-up 12 may be positioned on a portion (e.g., a frame 32) of one or more embedded members 30. Next, a portion (e.g., an extending portion 36) of the embedded member(s) 30 may be inserted through an aperture 62 of the caul plate 60 and into a seat 72. It is contemplated that in many applications it may be advantageous to position the substrate lay-up 12 such that a portion thereof is positioned between a portion of the embedded member 30 and the resin side 60a of the caul plate 60. However, the optimal dimensions, orientation, and/or configuration of the substrate lay-up 12 adjacent any embedded member 30 and/or portion thereof in no way limits the scope of the present disclosure unless so indicated in the following claims.

Additional substrate lay-up 12 may be positioned on the resin side 60a of the caul plate 60 after a portion of one or more embedded members 30 have been inserted into one or more apertures 62 (and/or corresponding seat(s) 72). Simultaneously or after additional substrate lay-up 12 has been positioned on the resin side 60a of the caul plate 60, other embedded members 30 (which may be adjacent a contour 63 and/or other apertures 62) may be positioned on the substrate lay-up 12 or adjacent the resin side 60a of the caul plate 60. In an aspect, a final layer of substrate lay-up 12 may be positioned over the final embedded members 30.

After all the required embedded members 30 and substrate lay-up 12 has been positioned on the caul plate 60, an outer member 50 may be positioned over the caul plate 60, substrate lay-up 12, and embedded members 30. The outer member 50 may be configured substantially equivalent to, similar to, and/or differently than the outer member 50 described in relation to FIGS. 1-15 without limitation unless so indicated in the following claims. In one aspect, the outer member 50 may include a flange 52 around the periphery thereof, and the flange 52 may be configured such that it corresponds in relative size, shape, and/or dimensions with a table contour 83, such that the flange 52 may seat within the flange 52 and provide a hermetic seal between the flange 52 and the bag 70. It is further contemplated that the periphery of the flange 52 may be positioned interior with respect to the vacuum trough 78.

After the outer member 50 has been properly positioned, a cover 40 may be positioned over the outer member 50 such that an interior surface 42 of the cover may be positioned adjacent an exterior, exposed surface of the outer member 50. The cover 40 may be configured to include a sealing portion 42a, which sealing portion 42a may engage a portion of the peripheral material 70a of the bag 70 and/or peripheral seal 79 on the bag 70 so as to form an airtight and/or substantially airtight seal therebetween. In an aspect, the cover 40 may be configured substantially equivalent to, similar to, and/or differently than the cover 40 described in relation to FIGS. 1-15 without limitation unless so indicated in the following claims.

In light of the present disclosure, those of ordinary skill in the art will appreciate that the order in which a cover 40, outer member 50, substrate lay-up 12 and/or layers thereof, embedded member(s) 30, caul plate 60, and/or bag 70 may vary from one application of the present disclosure to the next and depend at least upon whether a bag 70 is positioned on a support base 16 or table 80, or whether the cover 40 and outer member 50 are positioned at a relative elevation lower than the bag 70 and/or caul plate 60. That is, in one embodiment of the present disclosure the cover 40 may serve as the bottom of the apparatus for making a part 10, the outer member 50 may be positioned on the interior surface 42 of the cover 40, substrate lay-up 12 and/or any embedded members 30 may be positioned adjacent the "B" side of the outer member 50, a caul plate 60 may be positioned adjacent the substrate lay-up 12 and/or embedded members 30, and a bag 70 may be positioned adjacent the caul plate 60 and/or flange 52 of the outer member 50. The same relative hermetic seals may be formed in such a configuration, and similar vacuum connection locations and/or resin injection locations may be used in such a configuration without limitation unless so indicated in the following claims. Furthermore, the scope of the present disclosure is not limited by the specific order of steps unless so indicated in the following claims.

After the cover 40 has been properly positioned, the air, moisture, and/or other fluid in an area between the bag 70 and the interior surface 42 of the cover 40 may be evacuated. In an aspect, the cover 40 and the outer member 50 may be configured such that a hermetic seal may be formed between a portion of the outer member 50 and a portion of the cover 40, which hermetic seal may serve to prevent resin 14 from migrating to a surface of the outer member 50 adjacent the interior surface 42 of the cover 40. Additionally, it is contemplated that in an aspect the hermetic seal may be positioned between a sealing portion 42a of the cover 40 and a flange 52 of the outer member 50. However, in another aspect a hermetic seal may be formed (in lieu of or in addition to a seal between a sealing portion 42a of the cover 40 and a flange 52 of the outer member 50) between a sealing portion 42a of the cover 40 and a peripheral seal 79 of the bag 70, and a vacuum trough 78 (which may be configured with one or more bag vacuum ports 74 therein) may serve to communicate a reduced pressure state around the entire periphery of the cover 40 and/or bag 70. Forming bag vacuum ports 74 in a vacuum trough 78 may mitigate and/or eliminate the need for physical clamps around the edge of the cover 40 to aid in the formation of a hermetic seal between the sealing portion 42a of the cover 40 and the corresponding element (e.g., fixture 20, bag 70, etc.). Accordingly, the scope of the present disclosure is not limited by the specific location of a seal between the cover 40 and the outer member 50 and/or bag 70 unless so indicated in the following claims.

This evacuation of the air, moisture, and/or other fluid in an area between the bag 70 and the interior surface 42 of the cover may be accomplished by engaging the bag vacuum port 74 with a vacuum pump (not shown). As the air, moisture, and/or other fluid in an area between the bag 70 and the interior surface 42 of the cover 40 is evacuated, the bag 70 may be drawn against the bag side 60b of the caul plate 60 so as to form an airtight or nearly airtight seal therebetween. Simultaneously or nearly simultaneously, a flange 52 of the outer member 50 may be biased toward a portion of the peripheral material 70a of the bag 70 or peripheral seal 79 thereof (or vice versa) so as to form an airtight or nearly airtight seal therebetween (such that the entire area within an interface between the flange 52 and peripheral material 70a, and between an interior surface of the outer member 50 positioned adjacent substrate lay-up 12 and an interior surface of the bag 70 adjacent the bag side 60b of the caul plate 60) is subjected to a reduced-pressure condition (the communication of which reduced-pressure condition may be aided by the vacuum trough 78). The optimal amount of pressure reduction may vary from one application to the next and is therefore in no way limiting to the scope of the present disclosure unless so indicated in the following claims. Clamps holding the cover 40 to the table 80 (and sandwiching at least a portion of the bag 70 therebetween) may be used to prevent and/or mitigate vacuum leaks.

After the desired amount of vacuum has been achieved (which generally may be between 0.0 and 50 kPa), resin 14 may be introduced into an area adjacent the flange 52. It is contemplated that in an aspect, it may be advantageous to introduce resin 14 in an area of the flange 52 that is interior with respect to the periphery of the flange 52 by an amount sufficient to ensure that the introduction of resin 14 does not disrupt the seal between the flange 52 and the peripheral material 70a of the bag 70, but far enough from a periphery of the substrate lay-up 12 adjacent the flange 52 such that a resin gallery may be formed as previously described in reference to FIGS. 1-15. The resin 14 may be introduced through the bag inlet 71a formed in the bag 70, which bag inlet may be formed in the peripheral material 70a such that the bag inlet 71a is positioned adjacent the desired portion of the flange 52 when the outer member 50, caul plate 60, and bag 70 are properly positioned with respect to one another.

Alternatively, the resin 14 may be introduced through a resin port (not shown) formed in the cover 40 and a corresponding inlet location 52a (which inlet location 52a may be similar to that shown in FIG. 11) formed in the flange 52, such that the resin 14 may move from one side of the outer member 50 (which side may be opposite the substrate lay-up 12) to a side of the outer member 50 adjacent the substrate lay-up 12. Alternatively, an inlet 23 may be formed in the support base 16 (or component thereof), fixture 20, or in the table 80 such that resin 14 may be drawn from an area adjacent the peripheral material 70a of the bag 70 inward toward an area adjacent the bag vacuum port 74 (on the resin side 60a of the caul plate 60). Accordingly, the specific and/or relative locations of resin 14 introduction (e.g., inlet 23, inlet location 52a, caul plate inlet 61a, and/or bag inlet 71a) and/or where a vacuum is connected (e.g., outlet 21, vacuum port 64, and/or bag vacuum port 74) in no way limits the scope of the present disclosure unless so indicated in the following claims.

Generally, it may be preferable to expose only one side of the outer member 50 to resin, which side is adjacent the substrate lay-up. However, any suitable position for injecting resin 14 may be used without limitation unless so indicated in the following claims. For example, in an aspect resin 14 may be introduced through an inlet location 52a positioned near a geometric center of the outer member 50, and the bag 70 may be configured such that a bag vacuum port 74 (and a corresponding vacuum port 64 in the caul plate 60) may be positioned in an area adjacent the outer member flange 52 and/or peripheral material 70a of the bag 70. Furthermore, as used herein, "injected" may include but is not limited to a motive force for resin 14 resulting merely from reduced pressure in an area between the bag 70 and the cover 40 (which may be achieved via fluidly connecting that area to a vacuum pump) without limitation unless so indicated in the following claims.

After the resin 14 has been injected, the resin 14 may migrate through the substrate lay-up 12 toward the bag vacuum port 74. An airtight or nearly airtight seal between the bag side 60b of the caul plate 60 and the bag 70 may prevent and/or mitigate migration of resin 14 to any area on the bag side 60b of the caul plate 60. In such a configuration, all or nearly all resin 14 may remain on the resin side 60a of the caul plate 60.

After the resin 14 has cured, it is contemplated that all or a portion of the flange 52 may be removed as sacrificial to the finished part 10. During curing of the part 10, the bag 70, cover 40, and/or other portion of the part 10 or structure adjacent the part 10 may be temperature controlled for optimal strength and/or curing time, or for other considerations of the fabrication method and/or characteristic of the part 10. Many times this temperature control may require removing heat from various components, however, the scope of the present disclosure is not so limited unless so indicated in the following claims. Generally, the present method requires less resin than comparable methods of the prior art, which in turn generates less heat, thereby reducing cooling time required, thereby providing an increased production capacity of parts 10 from a given number of apparatuses. Reducing the heat generated during curing may also benefit the aesthetics of the part 10 being produced, and reducing the amount of resin required increases the economic feasibility of making the part 10.

Upon adequate cooling and/or curing of the part 10, vacuum may be removed and the cover 40 may be removed, exposing the outer member 50 of the part 10 (which exposed surface may not have interacted with resin during making the part 10). The part 10 may then be disengaged from the caul plate 60 and bag 70, and the part 10 may be finished (which may include removing all or a portion of the flange 52 as previously described).

The present disclosure provides numerous advantages over the prior art, including but not limited to decreased time required to fabricate a part 10. By way of illustration, a fiberglass reinforced polymer part fabricated according to the prior art typically requires applying a gel coat to a mold and waiting for the gel coat to cure before placing substrate lay-up 12 on the gel coat. Accordingly, the mold is occupied the entire time the gel coat is curing. However, with the present method there is no need for gel coat, and therefore no time required in the fabrication of the part 10 is expended on the curing of a gel coat. Another advantage to not requiring a gel coat is that a stock of outer members 50 may be on hand, such that variances in supply of outer members 50 need not affect production rates of parts 10. An additional advantage may be the ability to inspect all surfaces of the outer member 50 (including but not limited to the surface thereof that may constitute the A side of the part 10) prior to moving forward with making a part 10 using the outer member 50 reducing rework or scrapped parts.

It is contemplated that the caul plate 60, bag 70, and associated elements and methods disclosed and described herein may enjoy several advantages compared to the prior art. Such advantages may include but are not limited to: (1) reduced resin 14 usage for fabricating a specific part 10 (which may result in a lighter and/or stronger part 10), which may be due at least in part to a more uniform resin 14 distribution throughout the substrate lay-up 12 (which may be due at least in part to the amount of flexibility in the caul plate 60); (2) reduced cleaning between fabrication of two parts, which may be due at least in part to the material of construction for the caul plate 60 and its interaction and/or lack of adhesion with chemicals in the resin 14 (e.g., styrene); (3) lower replacement costs related to replacing a caul plate 60 and/or bag 70 compared to replacing a fixture 20; and, (4) lower initial costs in producing a caul plate 40 compared to a fixture 20. However, other advantages may exist without departing from the scope of the present disclosure unless so indicated in the following claims.

The embedded members 30 may be any structure suitable for the particular part 10 and constructed of any suitable material without limitation unless so indicated in the following claims. In an aspect it is contemplated that an embedded member 30 may provide robust connection points for other structures, such as bolts, rods, actuators, and/or other components without limitation unless so indicated in the following claims. In an aspect, the resin 14 may be colored so that the resultant part 10 may be uniform or relatively uniform in color on both the side formed with substrate lay-up 12 and resin 14 (the B side), and the side comprising the outer member 50 (the A side). Additionally, because the outer member 50 may be formed separately and later fused and/or bonded to the substrate lay-up 12/resin 14, the outer member 50 may be formed with an aesthetic feature needed for the A side of the finished part 10 without limitation unless so indicated in the following claims. For example, the outer member 50 may be formed with a specific texture (e.g., simulated wood grain, glossy metallic finish, matte finish, etc.), pattern (embossed logo, recessed features, smooth and/or embedded patterns, etc.), and/or a specific color and/or set of colors. Accordingly, the scope of the present disclosure is in no way limited by the specific configuration of the outer member 50 and/or A side of the finished part 10 unless so indicated in the following claims.

The materials used to construct the support base 16, fixture 20, embedded member 30, cover 40, outer member 50, caul plate 60, bag 70, table 80 and various elements and/or components thereof will vary depending on the specific application thereof, but it is contemplated that polymers, metals, metal alloys, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various methods and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the support base 16, fixture 20, embedded member 30, cover 40, outer member 50, caul plate 60, bag 70, table 80, components thereof, and/or methods of using same are not limited to the specific embodiments pictured and described herein, but are intended to apply to all similar apparatuses and methods for fabricating a part 10. Modifications and alterations from the described embodiments will occur to those skilled in the art without departure from the spirit and scope of the present disclosure.

Any of the various features, components, functionalities, advantages, aspects, configurations, etc. for the support base 16, fixture 20, embedded member 30, cover 40, outer member 50, caul plate 60, bag 70, table 80, components thereof, and/or methods of using same may be used alone or in combination with one another depending on the compatibility of the features, components, functionalities, advantages, aspects, configurations, etc. Accordingly, an infinite number of variations of the present disclosure exist. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the support base 16, fixture 20, embedded member 30, cover 40, outer member 50, caul plate 60, bag 70, table 80, components thereof, and/or methods of using same have been described in connection with preferred aspects and specific examples, it is not intended that the scope be limited to the particular embodiments and/or aspects set forth, as the embodiments and/or aspects herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A method for forming a part, said method comprising:
   a. providing a table, said table comprising:
      i. a top surface, a table contour formed in said top surface;
      ii. a cavity formed in said top surface;
   b. positioning a bag on said table, said bag comprising:
      i. a bag contour corresponding to said table contour in a shape, a size, and a relative position of said table contour;
      ii. a seat having a relative position corresponding to said cavity in said table with respect to a relative position of said cavity; and,
      iii. a bag inlet formed as an aperture extending through said bag, wherein a resin is introduced into said space via said bag inlet;
   c. ensuring said table contour is positioned adjacent said bag contour;
   d. ensuring said seat is positioned adjacent said cavity;
   e. positioning a caul plate on said bag, said caul plate comprising:
      i. a first side constituting a resin side;
      ii. a second side constituting a bag side, wherein said bag side is positioned adjacent said bag during use;
      iii. an aperture extending through said caul plate from said resin side to said bag side, wherein a relative position of said aperture corresponds to said relative position of said seat;
      iv. a caul plate inlet;
      v. a contour, wherein said contour corresponds to said bag contour in said shape, said size, and said relative position of said table contour;
   f. positioning an extending portion of an embedded member through said aperture and into said seat;
   g. positioning a frame of said embedded member adjacent said resin side of said caul plate;
   h. placing a first portion of substrate lay-up on said caul plate;
   i. positioning an outer member over said first portion of substrate lay-up, wherein said outer member is formed with a flange around a periphery thereof;
   j. positioning a cover over said outer member, wherein said cover and said bag are configured to seal an area therebetween from an external environment;
   k. reducing the pressure within a space between said outer member and said resin side of said caul plate to an amount less than ambient pressure;
   l. introducing said resin into said space;
   m. controlling the temperature between said cover and said bag;
   n. allowing said resin and said first portion of substrate lay-up to cure into a substrate lay-up/resin medium;
   o. allowing the pressure within said space to return to approximately ambient pressure; and,
   p. removing said caul plate from said part.

2. The method according to claim 1 wherein said bag inlet is further defined as being positioned adjacent said flange of said outer member.

3. The method according to claim 2 wherein said caul plate further comprises a feature around a border of said caul plate.

4. The method according to claim 3 wherein said feature is further defined as a wave feature.

5. The method according to claim 4 wherein said bag further comprises a bag feature around a border of said bag, and wherein said bag feature corresponds to said feature in said border of said caul plate in a size, a shape, and a relative position.

6. A method for forming a part, said method comprising:
   a. providing a table, said table comprising:
      i. a top surface, a table contour formed in said top surface;
      ii. a cavity formed in said top surface;

b. positioning a bag on said table, said bag comprising:
   i. a bag contour corresponding to said table contour in a shape, a size, and a relative position of said table contour;
   ii. a seat having a relative position corresponding to said cavity in said table with respect to a relative position of said cavity; and,
   iii. a bag inlet formed as an aperture extending through said bag, wherein a resin is introduced into said space via said bag inlet;

c. ensuring said table contour is positioned adjacent said bag contour;

d. ensuring said seat is positioned adjacent said cavity;

e. positioning a caul plate on said bag, said caul plate comprising:
   i. a first side constituting a resin side;
   ii. a second side constituting a bag side, wherein said bag side is positioned adjacent said bag during use;
   iii. an aperture extending through said caul plate from said resin side to said bag side, wherein a relative position of said aperture corresponds to said relative position of said seat;
   iv. a caul plate inlet;
   v. a contour, wherein said contour corresponds to said bag contour in said shape, said size, and said relative position of said table contour;

f. positioning an extending portion of an embedded member through said aperture and into said seat;

g. positioning a frame of said embedded member adjacent said resin side of said caul plate;

h. placing a first portion of substrate lay-up on said caul plate;

i. positioning an outer member over said first portion of substrate lay-up, wherein said outer member is formed with a flange around a periphery thereof;

j. positioning a cover over said outer member, wherein said cover and said bag are configured to seal an area therebetween from an external environment;

k. introducing said resin into said space via a pressure differential between said space and a source of said resin;

l. controlling the temperature between said cover and said bag;

m. allowing said resin and said first portion of substrate lay-up to cure into a substrate lay-up/resin medium;

n. allowing the pressure within said space to return to approximately ambient pressure; and, o. removing said caul plate from said part.

7. The method according to claim 6 wherein said pressure differential is further defined such that a pressure within said space is less than a pressure of said source of said resin.

8. The method according to claim 6 wherein said bag inlet is further defined as being positioned adjacent said flange of said outer member.

9. The method according to claim 8 wherein said caul plate further comprises a feature around a border of said caul plate.

10. The method according to claim 9 wherein said feature is further defined as a wave feature.

11. The method according to claim 10 wherein said bag further comprises a bag feature around a border of said bag, and wherein said bag feature corresponds to said feature in said border of said caul plate in a size, a shape, and a relative position.

* * * * *